(12) United States Patent
Asanuma et al.

(10) Patent No.: US 9,806,542 B2
(45) Date of Patent: Oct. 31, 2017

(54) WIRELESS POWER TRANSMITTING DEVICE AND WIRELESS POWER TRANSMITTING SYSTEM

(71) Applicant: Panasonic Corporation, Osaka (JP)

(72) Inventors: Kenichi Asanuma, Osaka (JP); Hiroshi Yamamoto, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 224 days.

(21) Appl. No.: 14/878,491

(22) Filed: Oct. 8, 2015

(65) Prior Publication Data

US 2016/0028248 A1 Jan. 28, 2016

Related U.S. Application Data

(63) Continuation of application No. PCT/JP2014/003124, filed on Jun. 12, 2014.

(30) Foreign Application Priority Data

Jul. 31, 2013 (JP) .................................. 2013-159149

(51) Int. Cl.
*H01F 27/42* (2006.01)
*H02J 5/00* (2016.01)
(Continued)

(52) U.S. Cl.
CPC .............. *H02J 5/005* (2013.01); *H02J 7/025* (2013.01); *H02J 17/00* (2013.01); *H02J 50/12* (2016.02); *H02J 50/60* (2016.02); *H02J 50/90* (2016.02)

(58) Field of Classification Search
CPC .. H02J 50/90; H02J 50/12; H02J 50/60; H02J 5/005; H02J 7/025; H02J 17/00
(Continued)

(56) References Cited

U.S. PATENT DOCUMENTS

| 2009/0079387 A1 | 3/2009 | Jin et al. | |
| 2010/0084918 A1* | 4/2010 | Fells | H02J 5/005 307/32 |

(Continued)

FOREIGN PATENT DOCUMENTS

| CN | 102239619 A | 11/2011 |
| JP | 2001-309579 | 11/2001 |

(Continued)

OTHER PUBLICATIONS

English Translation of Chinese Search Report dated Feb. 15, 2017 for the related Chinese Patent Application No. 201480012434.1.
(Continued)

*Primary Examiner* — Thomas Skibinski
(74) *Attorney, Agent, or Firm* — Greenblum & Bernstein, P.L.C.

(57) ABSTRACT

A wireless power transmitting device includes a self-oscillator circuit, a detection circuit that detects at least one of an oscillation frequency of the self-oscillator circuit and an output voltage of the self-oscillator circuit, a detection resonator that outputs, to detect a position of the power receiving device, power output by the self-oscillator circuit, and a control circuit that detects a degree to which the power receiving device approaches the detection resonator, based on a result of a detection performed by the detection circuit.

13 Claims, 20 Drawing Sheets

(51) Int. Cl.
*H02J 17/00* (2006.01)
*H02J 7/02* (2016.01)
*H02J 50/90* (2016.01)
*H02J 50/60* (2016.01)
*H02J 50/12* (2016.01)

(58) Field of Classification Search
USPC ..... 307/104, 31, 32; 320/108, 107; 455/41.1
See application file for complete search history.

(56) References Cited

U.S. PATENT DOCUMENTS

| | | | |
|---|---|---|---|
| 2010/0144269 A1 | 6/2010 | Do et al. | |
| 2011/0059694 A1 | 3/2011 | Audic | |
| 2012/0062173 A1* | 3/2012 | Choi | H02J 5/005 320/108 |
| 2017/0179772 A1* | 6/2017 | Asanuma | H02J 50/12 |

FOREIGN PATENT DOCUMENTS

| | | |
|---|---|---|
| JP | 2005-006460 | 1/2005 |
| JP | 2009-247194 | 10/2009 |
| JP | 2010-183706 | 8/2010 |
| JP | 2012-504931 | 2/2012 |
| JP | 2012-170271 | 9/2012 |
| WO | 2014/041863 | 3/2014 |

OTHER PUBLICATIONS

International Search Report of PCT application No. PCT/JP2014/003124 dated Aug. 5, 2014.
The Extended European Search Report dated Jun. 14, 2016 for European Patent Application No. 14831985.8.

* cited by examiner

FIG. 3
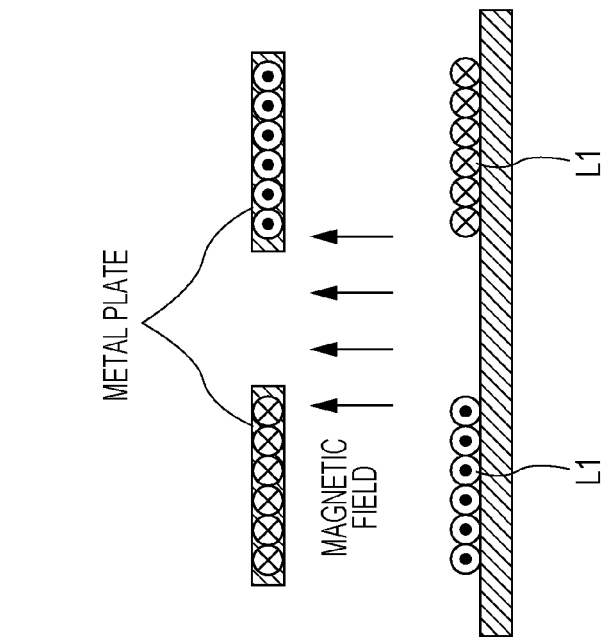
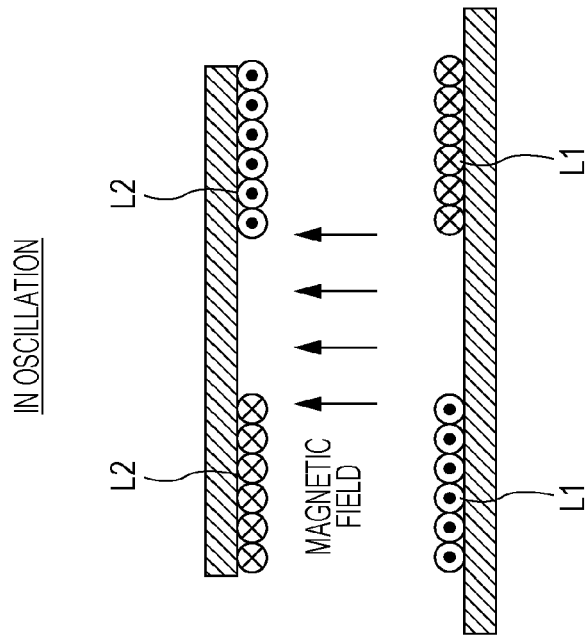

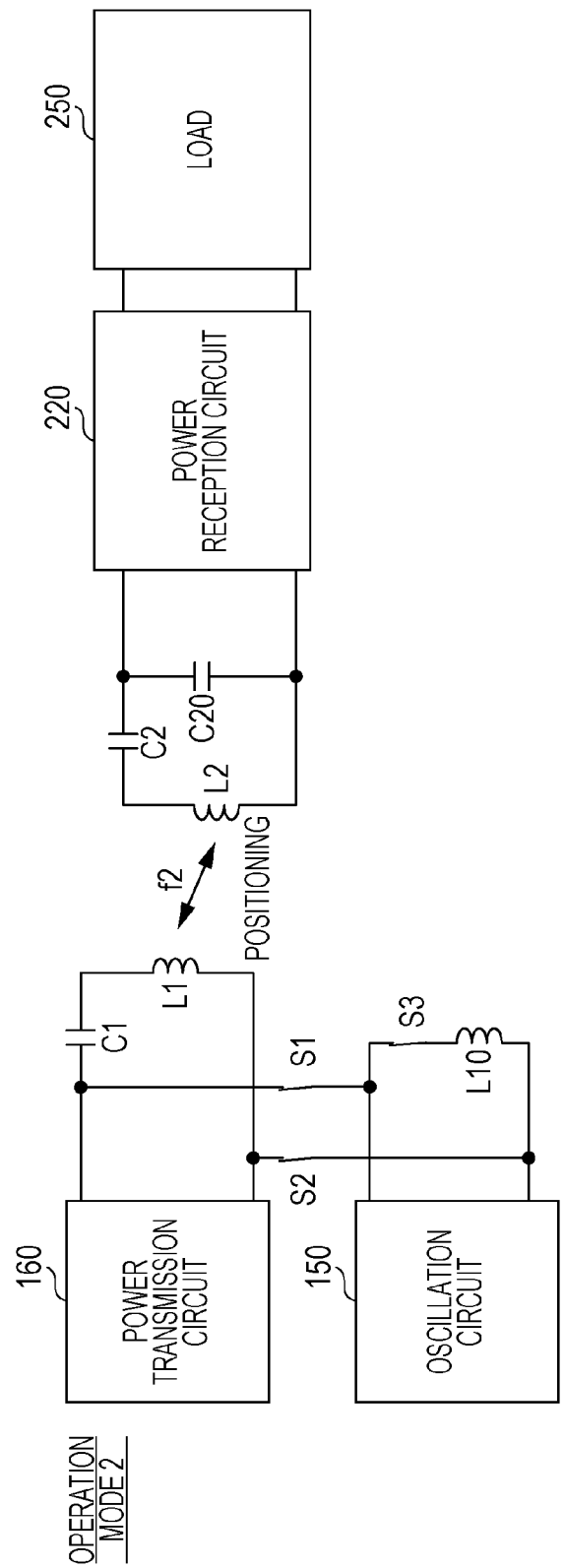

WIRELESS POWER TRANSMITTING DEVICE AND WIRELESS POWER TRANSMITTING SYSTEM

BACKGROUND

1. Technical Field

The present disclosure relates to a wireless power transmitting device and a wireless power transmitting system that wirelessly transmit power.

2. Description of the Related Art

In recent years, in a mobile electronic device or a mobile EV device such as a portable telephone device, an electric vehicle, or the like, a wireless power transmission technique for wireless charging by using inductive coupling between coils has been developed. The wireless power transmitting system includes a power transmitting device having a power transmitting coil (transmission antenna) and a power receiving device having a power receiving coil (reception antenna). A magnetic field generated by the power transmitting coil is captured by the power receiving coil thereby transmitting power without direct contact.

Japanese Unexamined Patent Application Publication No. 2005-6460 discloses an example of such a wireless power transmitting system.

SUMMARY

In one general aspect, the techniques disclosed here feature that a wireless power transmitting device that wirelessly transmits power to a power receiving device, includes a self-oscillator circuit, a detection circuit that detects at least one of an oscillation frequency of the self-oscillator circuit and an output voltage of the self-oscillator circuit, a detection resonator that outputs, to detect a position of the power receiving device, power output by the self-oscillator circuit, and a control circuit that detects a degree to which the power receiving device approaches the detection resonator, based on a result of a detection performed by the detection circuit.

The wireless power transmitting device according to the aspect of the present disclosure realizes positioning adapted to various types of power receiving coils having different electrical characteristics.

The wireless power transmitting device according to the aspect of the present disclosure realizes accurate positioning adapted to various types of power receiving coils having different electrical characteristics.

It should be noted that general or specific aspects may be implemented as a system, a method, an integrated circuit, a computer program, a storage medium, or any selective combination of a system, an device, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an operation principle of the wireless power transmitting system according to the first embodiment;

FIG. 11B is a diagram illustrating states of the switches in a second operation mode according to the third embodiment;

Figure 1:
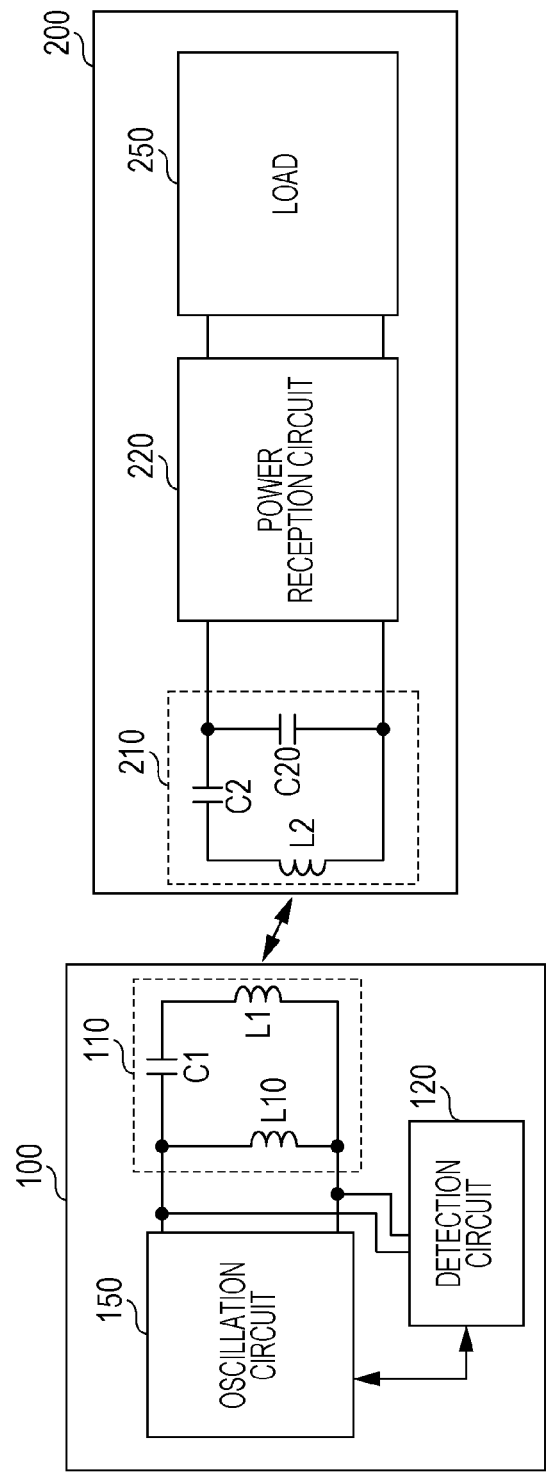
FIG. 1 is a block diagram illustrating a general overview of a constitution of a wireless power transmitting system according to a first embodiment.

DETAILED DESCRIPTION (Underlying Knowledge Forming Basis of the Present Disclosure)

First, a viewpoint of an aspect of the present disclosure is described. When power transmission is performed in a wireless power transmitting system, if there is a metallic object close to a power transmitting coil or a power receiving coil, this may result in a possibility that an eddy current occurs in the metallic object and thus the metallic object is heated. Furthermore, in a case where there is a large deviation in position between the power transmitting coil and the power receiving coil, there is a risk that a leakage flux causes a metallic object other than the coil to be heated. Therefore, to achieve safe wireless power transmission, it is desirable to perform positioning between the power transmission/reception coils.

To resolve the problem described above, Japanese Unexamined Patent Application Publication No. 2005-6460 discloses a technique of performing positioning between power transmission/reception coils. In a wireless power transmitting system disclosed in Japanese Unexamined Patent Application Publication No. 2005-6460, power is transmitted at two frequencies. When output voltage values on a terminal side both reach predetermined thresholds at two respective frequencies, an LED on a power reception side is turned on, and a user is notified that accurate positioning has been completed.

In the wireless power transmitting system disclosed in Japanese Unexamined Patent Application Publication No. 2005-6460, a power transmission-reception circuit pair including power transmission-reception coils is limited to a specific type (in which the distance between coils is small) as is the case, for example, with an electric shaver of a wirelessly chargeable type. In such a case, the thresholds described above are uniquely determined, and thus it is possible to perform accurate position detection. On the other hand, in a general circumstance in which charging is performed for various AV devices such as a smartphone, a tablet device, and the like, the power receiving coil and the power reception circuit vary in electric characteristics. That is, in a case where a single power transmission stage is used adaptively for various power receiving coils and power reception circuits having different electrical characteristics, there is a problem that it is difficult to uniquely determining voltage thresholds for positioning.

Intensive investigation by the present inventors has revealed that it is important to detect a characteristic of a power receiving coil that resonates with self-excited oscillation of a transmission coil while minimizing an influence by a power reception circuit connected to a load. In the wireless power transmitting system disclosed in Japanese Unexamined Patent Application Publication No. 2005-6460, a characteristic of a power receiving coil connected to a power reception circuit connected to a load is detected. Therefore, it is difficult to achieve accurate positioning adaptively for various power receiving coils and power reception circuits having different electrical characteristics.

Through the investigation described above, the present inventors have got ideas of various aspects of the present disclosure described below.

In an aspect, the present disclosure provides a wireless power transmitting device that wirelessly transmits power to a power receiving device, including a self-oscillator circuit, a detection circuit that detects at least one of an oscillation frequency of the self-oscillator circuit and an output voltage of the self-oscillator circuit, a detection resonator that outputs, to detect a position of the power receiving device, power output by the self-oscillator circuit, and a control circuit that detects a degree to which the power receiving device approaches the detection resonator, based on a result of a detection performed by the detection circuit.

In an embodiment, when the detected oscillation frequency becomes higher than a predetermined threshold, the detection circuit may output information indicating that positioning between the power receiving device and the detection resonator is completed.

In an embodiment, when an amplitude of a voltage output from the self-oscillator circuit becomes smaller than a predetermined threshold, the detection circuit may output information indicating that positioning between the power receiving device and the detection resonator is completed.

In an embodiment, the detection resonator may have a Q value equal to or greater than 100 when the oscillation circuit is oscillating.

In an embodiment, the oscillation frequency may be substantially equal to a resonance frequency of a resonator of a power receiving device.

In an embodiment, the oscillation frequency may be set to be lower than a self-resonant frequency of the detection coil.

In an embodiment, the oscillation frequency may be set to be higher than the resonance frequency of the detection resonator.

In an embodiment, the wireless power transmitting device further includes a detection transmitter resonator, a power transmission circuit that is connected to the detection transmitter resonator and that outputs AC power for transmitting power, a first switch that switches a conduction state of a current between the detection transmitter resonator and the oscillation circuit, and a control circuit that switches a mode between a alignment mode in which the first switch is turned on to operate the oscillation circuit and a power transmission mode in which the first switch is turned off to operate the power transmission circuit.

In an embodiment, the detection transmitter resonator may further include a capacitor, an inductor and a detection coil, the inductor being connected to the oscillation circuit and in parallel with the detection coil, and the wireless power transmitting device may further include a second switch that switches a conduction state of a current from an output of the oscillation circuit to the inductor, and the detection circuit may detect whether an approaching object is the power receiving coil or not based on a change in the oscillation frequency when the second switch is in one of an on-state and an off-state, and may detect the degree to which the power receiving coil approaches based on a change in the oscillation frequency when the second switch is in the other state.

In an embodiment, the wireless power transmitting device may further include a light source control circuit that controls a light source to emit light based on a result of a detection performed by the detection circuit.

In an embodiment, the light source control circuit may change a light source that emits light depending on the degree, detected by the detection circuit, to which the power receiving coil approaches the detection coil.

In an embodiment, the wireless power transmitting device may further include the light source.

In an embodiment, the wireless power transmitting device may further include a display control circuit that controls a display to display information indicating a result of a detection performed by the detection circuit.

In an embodiment, the display may be disposed in a power receiving device including the receiver resonator.

In an aspect, the present disclosure provides a wireless power transmitting system including the wireless power transmitting device according to one of the aspects described above, and a power receiving device including the receiver resonator.

Embodiments of the present disclosure are described below with reference to drawings. Note that similar constituent elements are denoted by the same symbols. Note that the present disclosures are not limited to the embodiments described below.

First Embodiment: Basic Concept

FIG. 1 is a block diagram illustrating a general overview of a constitution of a wireless power transmitting system according to a first embodiment of the present disclosure. This wireless power transmitting system includes a power transmitting device 100 and a power receiving device 200, and is capable of wirelessly transmitting power from the power transmitting device 100 to the power receiving device 200. The power transmitting device 100 is, for example, a wireless charger, and the power receiving device 200 may be, for example, a device having a secondary battery, such as a portable information terminal, an electric vehicle, or the like. The power transmitting device 100 is capable of not only transmitting power to the power receiving device 200 but also detecting whether or not a power receiving coil in the power receiving device 200 is at a proper position (where charging is possible). In the present description, this detection is referred to as "positioning". A detection result may be notified to a user by giving information in the form of light, an image, a voice, or the like from a light source, a display, a speaker, or the like disposed, for example, on the power transmitting device 100 or the power receiving device 200. Such functions described above make it possible for a user to get to know that the power receiving device 200 approaching the power transmitting device 100 has reached a proper position where power transmission is possible, and thus, it becomes possible to easily perform the positioning of the power receiving device 200.

In the present embodiment, the power transmitting device 100 includes an oscillation circuit 150 that outputs AC power, a detection resonator 110 including a detection coil L1, and a detection circuit 120 that detects how close to the detection coil L1 a power receiving coil L2 is located, based on a change in oscillation frequency of the oscillation circuit 150. The oscillation circuit 150 is a self-oscillator circuit capable of oscillating at a frequency substantially equal to a resonance frequency fr of a receiver resonator 210 in the power receiving device 200. Here, being "substantially equal" to fr does not necessary mean being exactly equal to fr but a difference of about ±15% from fr is allowed. The detection resonator 110 is a resonance circuit including the detection coil L1, a capacitor C1, and an inductor L10. The detection circuit 120 detects the power receiving coil L2 by detecting a change in frequency (oscillation frequency) of an AC output from the oscillation circuit 150. The detection circuit 120 may have not only the function of detecting a change in oscillation frequency but also a function of detecting approaching of an object by detecting a change in amplitude of an AC voltage output from the oscillation circuit 150. Although the power transmitting device 100 includes other elements such as a power transmission circuit, a control circuit, and the like in addition to the constituent elements illustrated in FIG. 1, the other elements are not illustrated in FIG. 1 for simplicity.

The power receiving device 200 includes a receiver resonator 210, a power reception circuit 220, and a load 250. The receiver resonator 210 is a resonance circuit including a power receiving coil L2, a capacitor C2 connected in series to the power receiving coil L2, and a capacitor C20 connected, in parallel with the power receiving coil L2, to the power reception circuit 220. The capacitor C20 is a circuit element disposed to adjust the resonance frequency of the receiver resonator 210, and this capacitor C20 is also referred to as a "parallel resonance capacitor". The resonance frequency of the receiver resonator 210 is set to a particular value fr as described above. AC power received by the receiver resonator 210 from the transmitter resonator via a space is transmitted to the power reception circuit 220. The power reception circuit 220 includes various circuits such as a rectifier circuit, a frequency conversion circuit, a control circuit, and the like, and the power reception circuit 220 convers the received AC power to DC power or low-frequency AC power usable by the load 250. The load 250 is, for example, a secondary battery which may be charged by power output from the power reception circuit 220.

Figure 2:
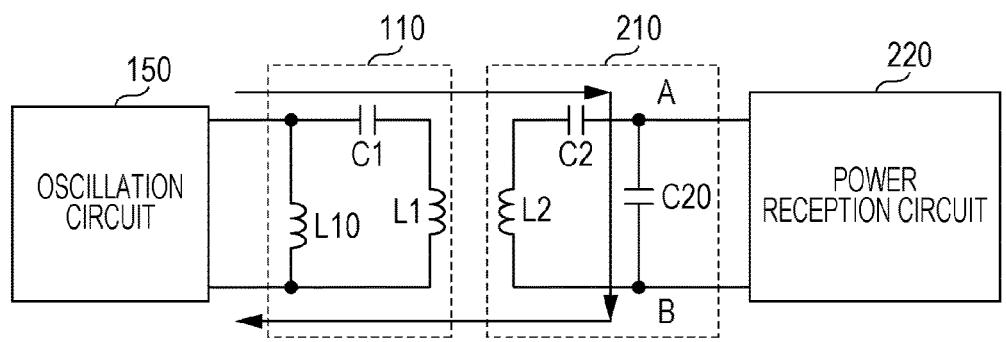
FIG. 2 is a block diagram illustrating an operation principle of the wireless power transmitting system according to the first embodiment.

FIG. 2 is a diagram illustrating an operation principle of the wireless power transmitting system according to the present embodiment. When the receiver resonator 210 including the power receiving coil L2, the capacitor C2, and the parallel resonance capacitor C20 is resonating with L2 and C2, no current flows between A and B illustrated in FIG. 2. That is, when seen from the detection coil L1, it seems that no short-circuit occurs between A and B. Therefore, an electrical characteristic seen from the detection coil L1 is influenced by a voltage drop in a power reception circuit 220 and a voltage drop across the load 250. This results in a reduction in accuracy of the position detection. On the other hand, when the receiver resonator 210 resonates with L2, C2, and C20, a current flows between A and B, and thus when seen from the detection coil L1, it seems that a short-circuit occurs between A and B. Therefore, the electrical characteristic seen from the detection coil L1 is not influenced by the power reception circuit. In this state, if the power receiving coil L2 is seen from the detection coil L1, it looks as if there is a metal plate at a close position as illustrated in FIG. 3. As a result of electromagnetic induction, a current flows through the power receiving coil L2 in a direction opposite to a direction in which a current flows through the detection coil L1. This results in a reduction in voltage, and thus a reduction occurs in impedance of the detection coil L1. The oscillation frequency is determined by the reciprocal of the impedance, and thus, in this situation, an increase in oscillation frequency occurs.

On the other hand, to reduce an influence of electromagnetic noise on a circuit close to the power receiving coil L2, in some cases, the power receiving coil L2 has a magnetic material for electromagnetic shielding. In the case where the power receiving coil L2 includes the magnetic material, because of an influence of a magnetic loss of the magnetic material, a voltage drop occurs across the detection coil L1. As a result, a voltage drop occurs in an oscillation waveform of the oscillation circuit 150.

As may be seen from the above description, by detecting a change in at least one of frequency and voltage of the oscillation waveform of the oscillation circuit 150, it is possible to detect that the power receiving coil L2, a metallic object, or a magnetic material has come to a location close to the detection coil L1. For example, in a case where the frequency becomes equal to or higher than a predetermined threshold, or in a case where the amplitude of the voltage becomes equal to or smaller than a predetermined threshold, it is possible to presume that the power receiving coil L2 has reached a position opposing the power transmitting coil L1.

The detection circuit 120 according to the present embodiment is capable of detecting a deviation of the position of the power receiving coil L2 with respect to the detection coil L1 by detecting a change in at least one of the frequency and the voltage of the AC output from the oscillation circuit 150. By notifying a user of this detection result, it becomes possible for the user to easily perform the positioning of the power receiving coil L2. After completion of the positioning, the power transmitting device 100 starts transmitting power by using a power transmission circuit instead of the oscillation circuit 150. Thus power is wirelessly supplied to the power receiving device 200.

The wireless power transmitting system according to the present embodiment is described in further detail below in terms of its constitution and operation.

Figure 4:
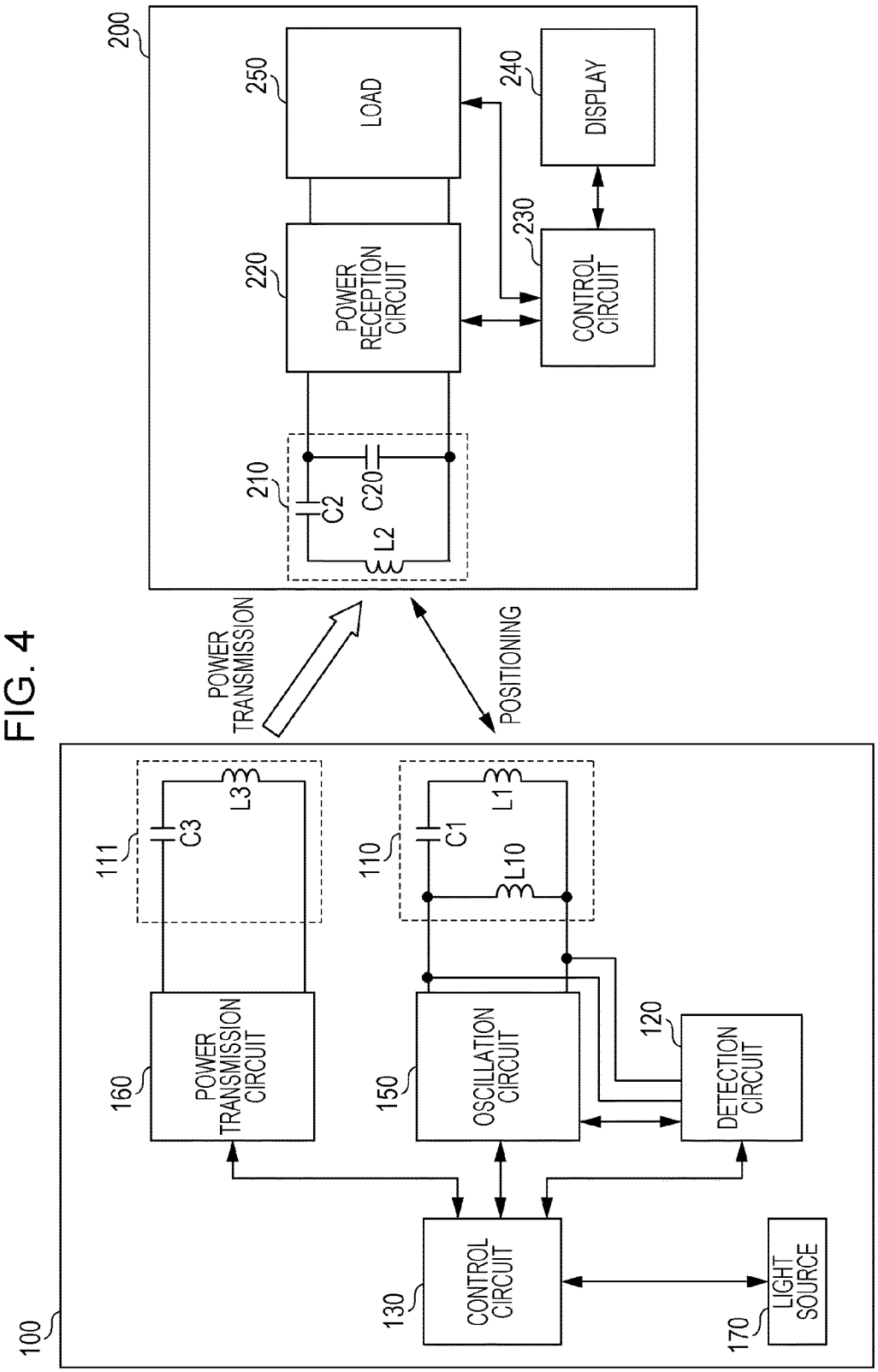
FIG. 4 is a block diagram illustrating a constitution of the wireless power transmitting system according to the first embodiment.

FIG. 4 is a block diagram illustrating a constitution of the wireless power transmitting system according to the present embodiment. The power transmitting device 100 includes, as described above, the oscillation circuit 150, the detection resonator 110, and the detection circuit 120, and further includes a power transmission circuit 160, a transmitter resonator 111, a light source 170, and a control circuit 130. On the other hand, the power receiving device 200 includes, as described above, the receiver resonator 210, the power reception circuit 220, and the load 250, and further includes a display 240 and a control circuit 230. Details of each element are described below.

Figure 5A:
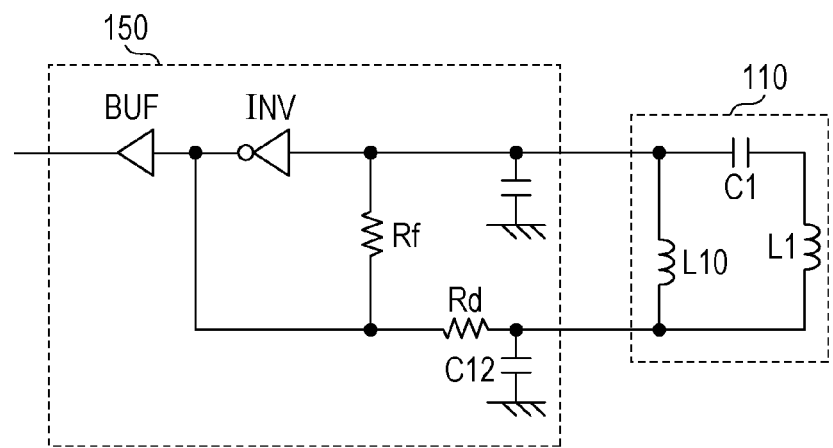
FIG. 5A is a diagram illustrating an example of a circuit constitution of an oscillation circuit 150 according to the first embodiment.

The oscillation circuit 150 is, as described above, a self-oscillator circuit that outputs an AC power for use in detecting the power receiving coil L2. The oscillation circuit 150 may be a known oscillation circuit based on an LC resonance principle, such as, a Colpitts oscillation circuit, a Hartley oscillation circuit, a Clapp oscillation circuit, a Franklin oscillation circuit, a Pierece oscillation circuit, or the like. A basic idea of the present embodiment is to accurately detect a change in impedance of the detection coil L1 by detecting a change in frequency or voltage corresponding to the change in impedance. As long as it is possible to make such a detection, the oscillation circuit is not limited to those described above, but other oscillation circuits and circuit topology may be used. FIG. 5A is a diagram illustrating an example of a circuit constitution of the oscillation circuit 150 using a Pierece oscillation circuit. When the power transmitting device 100 is in a waiting state, an intermittent operation is performed such that oscillation is performed intermittently to generate an AC power in a few periods, for example, once every one milliseconds to a few seconds thereby reducing power consumption, and the operation may be switched to a continuous operation mode only when the detection circuit 120 detects the power receiving coil L2 approaching.

The detection coil L1 in the detection resonator 110 may be realized by a thin planar coil formed in a board pattern or a wound coil using a copper wire, a litz wire, a twisted wire, or the like. To achieve sufficiently high detection sensitivity, the Q value of the detection coil L1 may be set to, for example, 100 or higher, although the Q value of the detection coil L1 may be set to a value smaller than 100. The capacitance of the capacitor C1 and the inductance of the inductor L10 may be set to proper values depending on the resonance frequency of the receiver resonator 210.

The detection circuit 120 detects the frequency and the voltage of the AC output from the oscillation circuit 150, and detects approaching of an object such as the power receiving coil L2 based on a change in frequency or the voltage. Specific processing of the detection circuit 120 will be described later.

Figure 5B:
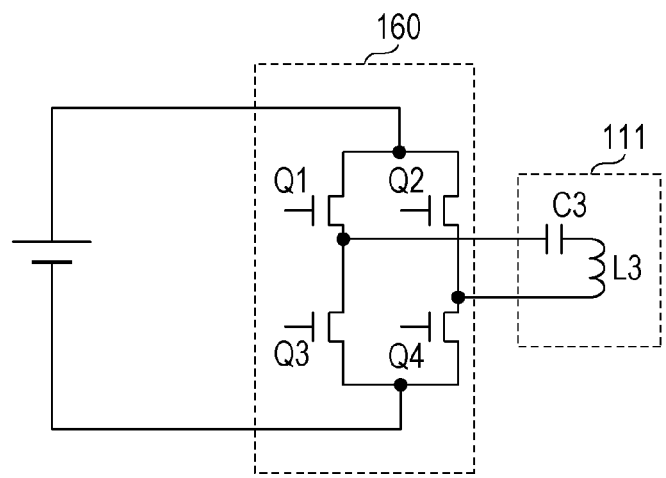
FIG. 5B is a diagram illustrating an example of a circuit constitution of a power transmission circuit 160 according to the first embodiment.

The power transmission circuit 160 is a circuit that outputs AC power for power transmission after the positioning is completed. The power transmission circuit 160 may be realized, for example, by a full-bridge inverter such as that illustrated in FIG. 5B. The power transmission circuit 160 illustrated in FIG. 5B converts DC power supplied from an external DC power source to AC power by controlling turning-on/off of four switching elements Q1 to Q4. The turning-on/off of the switching elements Q1 to Q4 is controlled by the control circuit 130. These switching elements Q1 to Q4 are set to be in an off-state in a detection mode using the oscillation circuit 150 and the detection resonator 110. In a power transmission mode after the detection mode is completed, the on/off switching is continuously performed by inputting pulses depending on a transmission frequency. The power transmission circuit 160 is not limited to the full-bridge inverter, but other types of oscillation circuits such as a half-bridge inverter, a D-class or E-class oscillation circuit, or the like may be employed.

The transmitter resonator 111 is a resonance circuit that transmits AC power output from the power transmission circuit 160. A power transmitting coil L3 and a capacitor C3 in the transmitter resonator 111 are basically similar to the detection coil L1 and the capacitor C1 in the detection resonator 110. To transmit power efficiently to the power receiving coil L2, the power transmitting coil L3 is disposed close to the detection coil L1. The inductance and the capacitance of these are set to proper values such that power transmission is properly performed depending on the resonance frequency of the power reception side including the power reception circuit 220.

The light source 170 is provided to notify a user of a result of a detection performed by the detection circuit 120. The light source 170 is, for example, an LED light source, and emits light based on the result of the detection performed by the detection circuit 120. The light source 170 may be a set of a plurality of light sources. The light source 170 may emit light from different light sources depending on the degree to which the power receiving coil L2 approaches, or may in stages change the number of light sources that are turned on to emit light. Instead of the light source 170, a display such as a liquid crystal display may be provided to display the result of the detection on the display.

The control circuit 130 is a processor that controls the operation of the whole power transmitting device 100. The control circuit 130 may be realized, for example, by a combination of a CPU and a memory in which a computer program is stored. Alternatively, it may be possible to employ dedicated hardware constituted to realize the operation according to the present embodiment. The control circuit 130 performs control in terms of switching between a detection mode in which the detection is performed by the oscillation circuit 150 and a power transmission mode in which the power transmission is performed by the power transmission circuit 160, and in terms of activating the light source 170 to emit light based on the result of the detection performed by the detection circuit 120. In the detection mode, the control circuit 130 stops the operation of the power transmission circuit 160 and drives the oscillation circuit 150. Conversely, in the power transmission mode, the control circuit 130 stops the operation of the oscillation circuit 150 and drives the power transmission circuit 160.

Note that the power transmitting device 100 may further include a communication circuit that notifies the power receiving device 200 of the result of the detection performed by the detection circuit 120. This makes it possible to send the detection result to the display 240 of the power receiving device 200, a not-illustrated light source, a speaker, or the like to notify a user of the status of the positioning.

In the present embodiment, the receiver resonator 210 is realized by a parallel resonance circuit. The power receiving coil L2 and the capacitor C2 may be, or may not be, similar to the detection coil L1 and the capacitor C1 in the detection resonator 110. The parallel capacitor C20 is disposed for adjusting the resonance frequency, and the parallel capacitor C20 has smaller capacitance than that of the capacitor C2.

The control circuit 230 is a processor that controls the operation of the whole power receiving device 200. The control circuit 230 may be realized, for example, by a combination of a CPU and a memory in which a computer program is stored. Alternatively, it may be possible to employ dedicated hardware constituted to realize the operation according to the present embodiment. The control circuit 230 controls power supply to the load 250 and displaying on the display 240. The control circuit 230 may be constituted to display on the display 240 the result of the detection performed by the detection circuit 120 in the power transmitting device 100 and received via a not-illustrated communication circuit. The display 240 may be a liquid crystal or an organic EL display.

In the present embodiment, the oscillation frequency is set to be lower than a self-resonant frequency of the detection coil L1. This is because frequencies higher than the self-resonant frequency cause the detection coil L1 not to function as an inductor. The oscillation frequency may be set to a value in a low frequency range from 20 kHz to 10 MHz in which the parallel capacitor C20 can be regarded, to a certain degree, as a lumped parameter circuit. The higher the frequency is, the higher the resolution is obtained and the position can be detected at a higher speed. In a case where the detection is performed at 1 μsec or shorter intervals, the oscillation frequency may be set to be equal to the reciprocal thereof, that is, from 1 MHz to 10 MHz.

Next, an operation of the wireless power transmitting system according to the present embodiment is described.

Figure 6:
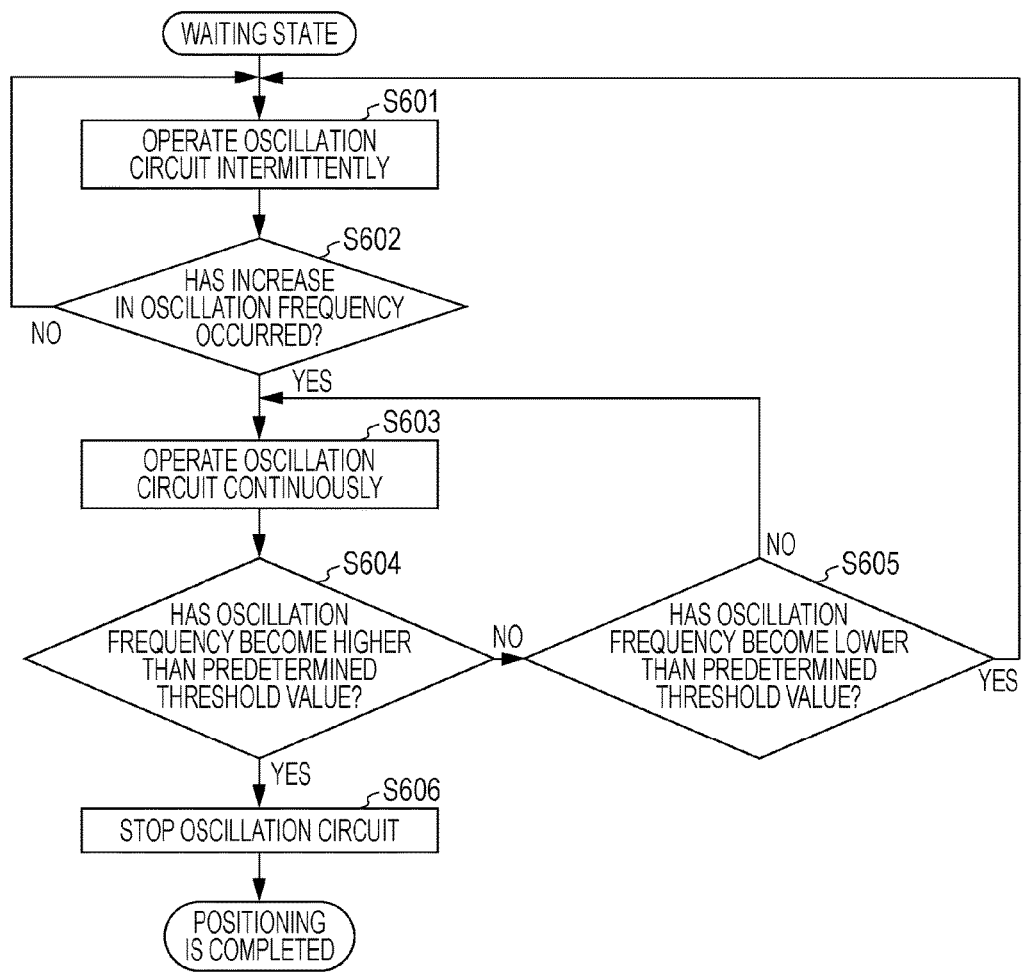
FIG. 6 is a flow chart illustrating an example of a positioning operation of the wireless power transmitting device according to the first embodiment.

FIG. 6 is a flow chart illustrating an example of a positioning operation performed by the power transmitting device 100. When the power of the power transmitting device 100 is turned on and the power transmitting device 100 goes to a waiting state, the control circuit 130 controls the oscillation circuit 150 to operate intermittently (step S601). That is, the oscillation circuit 150 is controlled to oscillate intermittently at predetermine time intervals (for example, every one millisecond to a few seconds), and whether or not an increase in oscillation frequency has occurred is monitored using the detection circuit 120 (step S602). When no increase in the oscillation frequency occurs, it can be determined that the power receiving device 200 is not approaching, and thus the processing flow returns to step S601 to continue a similar operation. When the detection circuit 120 detects an increase in oscillation frequency, it can be presumed that the power receiving device 200 is approaching, and thus the control circuit 130 controls the oscillation circuit 150 to continuously operate (step S603).

Subsequently, the detection circuit 120 determines whether the oscillation frequency has exceeded the predetermined threshold (step S604). If it is determined here that the oscillation frequency has not exceeded the predetermined threshold, then the detection circuit 120 determines whether the oscillation frequency has become lower than a predetermined threshold lower than the threshold described above (step S605). This is performed to determine whether or not to switch the operation back to the intermittent mode to reduce the power. In a case where the oscillation frequency is not lower than the predetermined threshold, it is presumed that the power receiving device 200 is still at a close location, and thus operations in steps S603 and S604 are repeated. Conversely, in the case where the oscillation frequency has become lower than the predetermined threshold, it is presumed that the power receiving device 200 has left sufficiently far away, the processing flow returns to step S601 in which the control circuit 130 controls the oscillation circuit 150 to operate intermittently.

On the other hand, in the case where in step S604 the oscillation frequency exceeds the predetermined threshold, it can be determined that the power receiving coil L2 has come to a position sufficiently close to the detection coil L1, and thus the detection circuit 120 sends information indicating this fact to the control circuit 130. In response to receiving this information, the control circuit 130 stops the oscillation circuit 150 (step S606). In this case, the control circuit 130 may control the light source 170 to emit light or may instruct the display 240 to display information indicating that the positioning is completed. This makes it possible to notify a user that the positioning is completed. In a case where the control circuit 130 has such a notification function, the control circuit 130 has a function as a "light source control circuit" or a "display control circuit". Thereafter, the control circuit 130 drives the power transmission circuit 160 to start power transmission. Note that the power transmission may be started not immediately after the oscillation circuit is stopped, but after it is confirmed that the change in frequency has stopped, for example, when a user puts the power receiving device 200 on the power transmitting device 100.

In the embodiment, via the operation described above, the power transmitting device 100 detects approaching of the power receiving coil L2 in the power receiving device 200 and outputs information indicating this fact. This makes it possible for a user to know that the power receiving device 200 has reached a proper location, and thus it is possible to easily perform the positioning.

Note that the operation in the present embodiment is not limited to the operation illustrated in FIG. 6. For example, the intermittent operation in steps S601 and S602 may be removed, and the determination process in step S605 may be removed. Furthermore, in step S604, there may be a plurality of thresholds, and information may be output to discretely indicate the degree of approaching of the power receiving coil L2 depending on the frequency level. Instead of step S604 or in addition to step S604, the detection circuit 120 may output information such that when the amplitude of the voltage output from the oscillation circuit 150 becomes lower than a predetermined threshold, the information is output to indicate that the positioning between the power receiving coil L2 and the detection coil L1 is completed.

Second Embodiment: Sharing Single Coil for Power Transmitting Coil and Detection Coil Next, a wireless power transmitting system according to a second embodiment of the present disclosure is described. The present embodiment is different from the first embodiment in that the detection resonator in the power transmitting device 100 also functions as the transmitter resonator. The following description focuses on differences from the first embodiment, and a duplicated description of similar elements is omitted.

Figure 7:
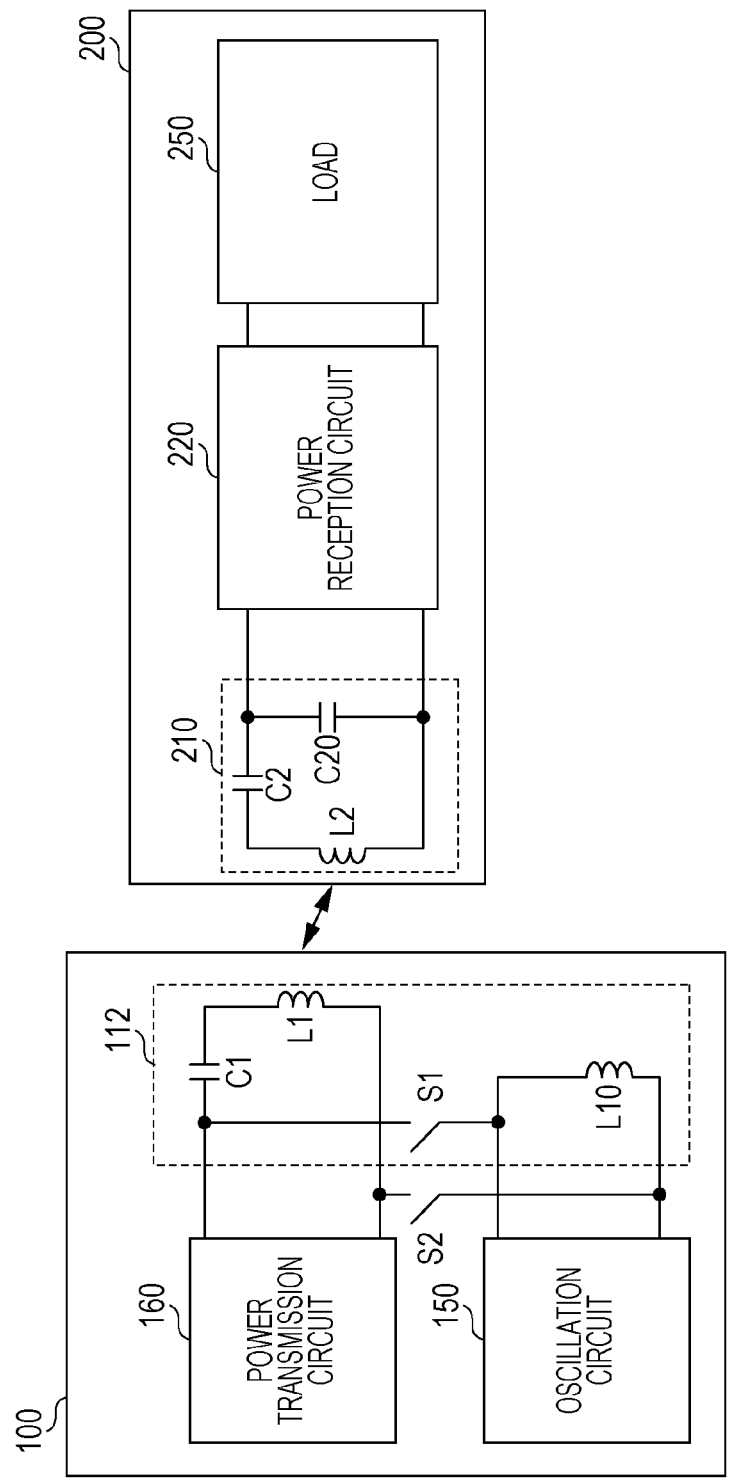
FIG. 7 is a block diagram illustrating a general overview of a constitution of a wireless power transmitting system according to a second embodiment.

FIG. 7 is a block diagram illustrating a general overview of a constitution of a wireless power transmitting system according to the present embodiment. Although only typical constituent elements are illustrated in FIG. 7, actually, the wireless power transmitting system may include other constituent elements illustrated in FIG. 4. This wireless power transmitting system includes, as with that according to the first embodiment, a power transmitting device 100 and a power receiving device 200. The power receiving device 200 is the same as that according to the first embodiment. The power transmitting device 100 according to the present embodiment is connected to the detection transmitter resonator 112 functioning as both the detection resonator and the transmitter resonator and is also connected to the detection transmitter resonator 112. The power transmitting device 100 includes a power transmission circuit 160 that outputs AC power for power transmission, an oscillation circuit 150 that outputs AC power for positioning, switches S1 and S2 that switch a conduction state of a current between the detection coil L1 and the oscillation circuit 150, and a control circuit 130 (not illustrated) that controls various parts. The control circuit 130 is constituted to switch a alignment mode in which the switches S1 and S2 are turned on and the oscillation circuit 150 is operated and a power transmission mode in which these switches are turned off and the power transmission circuit 160 is operated. The detection transmitter resonator 112 includes a detection coil L1, a capacitor C1, and an inductor L10. In the present embodiment, the detection coil L1 also functions as a power transmitting coil. The inductor L10 is connected to the detection coil L1 via the switches S1 and S2.

As for the switches S1 and S2, various kinds of bidirectional switches may be used. However, if on-resistance of a switch is large, an apparent reduction occurs in Q value of the coil, and thus it is necessary to select switches having proper on-resistance. For example, when resultant resistance of the resistor of the coil and the resistor of the switches is denoted by R, the on-resistance of the switches may be set such that $Q=\omega L1/R \geq 100$ ($\omega$ is angular frequency).

The operation according to the present embodiment is basically the same as the operation according to the first embodiment. However, the present embodiment includes an additional operation of turning off the switches S1 and S2 from the on-state when the control circuit 130 switches the detection mode to the power transmission mode.

The present embodiment provides a great advantage that sharing coil components results in a cost reduction and a weight reduction.

Third Embodiment: Oscillating at Two or More Frequencies

Next, a wireless power transmitting system according to a third embodiment of the present disclosure is described. The present embodiment is different from the second embodiment in that the power transmitting device 100 oscillates at two or more frequencies to make it possible to perform both detecting of the type of an object and positioning of the power receiving coil L2. The following description focuses on differences from the second embodiment, and a duplicated description of similar elements is omitted.

Figure 8:
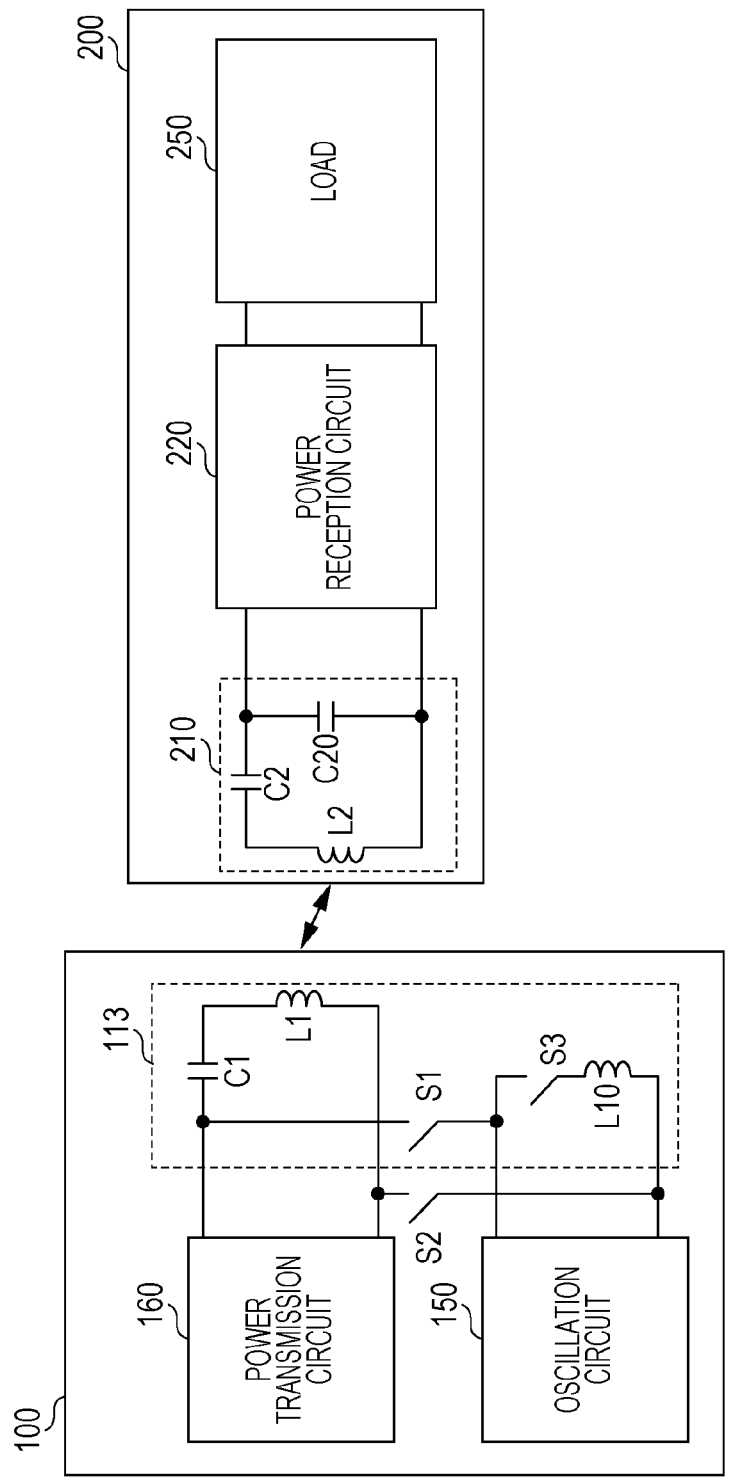
FIG. 8 is a block diagram illustrating a general overview of a constitution of a wireless power transmitting system according to a third embodiment.

FIG. 8 is a block diagram illustrating a general overview of a constitution of a wireless power transmitting system according to the present embodiment. Although only typical constituent elements are illustrated in FIG. 8, actually, the wireless power transmitting system may include other constituent elements illustrated in FIG. 4. This wireless power transmitting system includes, as with that according to the first embodiment and second embodiment, a power transmitting device 100 and a power receiving device 200. The power receiving device 200 is the same as that according to the first embodiment or the second embodiment. The power transmitting device 100 according to the present embodiment is different from the second embodiment in that a switch S3 is connected in series to the inductor L10 in the detection transmitter resonator 113 to make it possible to control a conduction state of a current between an output of the oscillation circuit 150 and the inductor L10. In the present embodiment, in a state in which the switches S1 and S2 are on and the switch S3 is off, the detection circuit 120 detects whether an approaching object is the power receiving coil L2 or not. Furthermore, in a state in which the switches S1 and S2 are on and the switch S3 is on, the detection circuit 120 detects a degree to which the power receiving coil L2 approaches. This makes it possible to achieve a further improvement in accuracy of detection by the power receiving coil L2.

Figure 9:
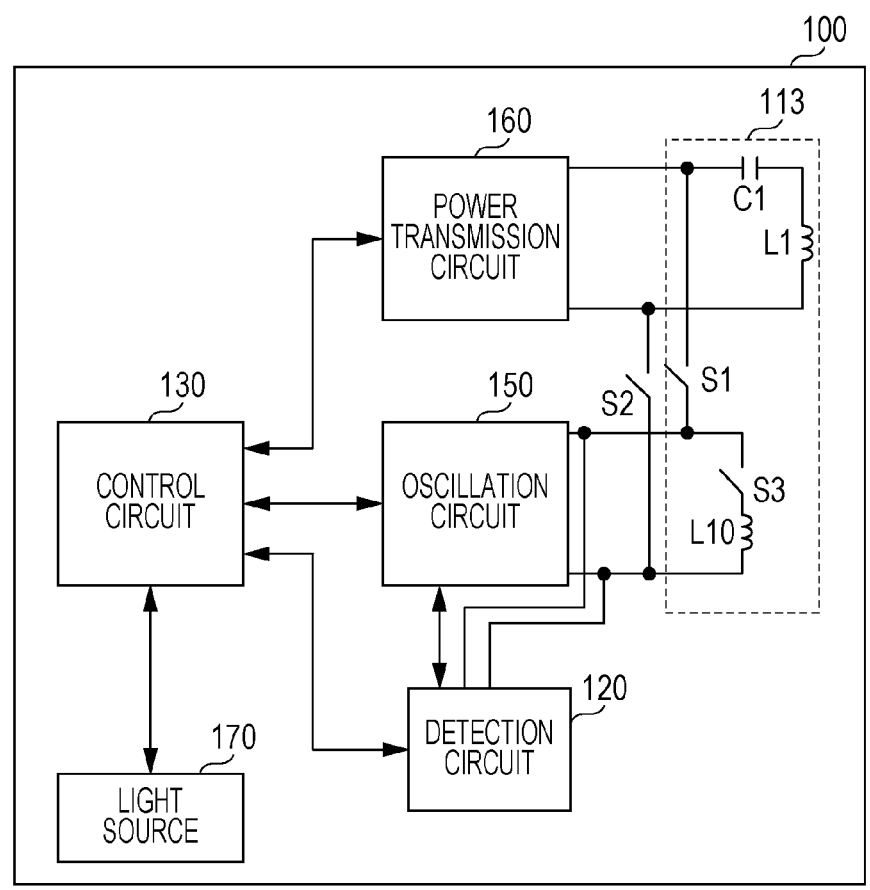
FIG. 9 is a block diagram illustrating a constitution of a power transmitting device 100 according to the third embodiment.

FIG. 9 is a block diagram illustrating a further specific constitution of the power transmitting device 100. As illustrated in FIG. 9, the detection transmitter resonator 113 functions as both the transmitter resonator and the detection resonator. The constitution of the detection transmitter resonator 113 is the same as that illustrated in FIG. 4 except that there is the switch S3 provided to switch the conduction state of the current between the inductor L10 and the oscillation circuit 150.

Figure 10:
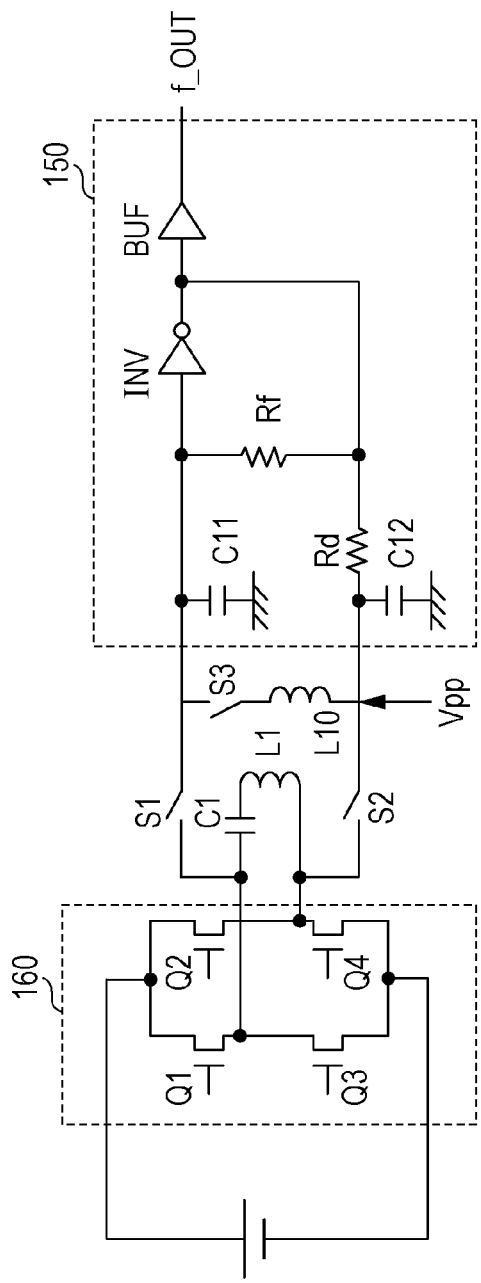
FIG. 10 is a circuit diagram illustrating specific examples of circuit constitutions of an oscillation circuit 150 and a power transmission circuit 160 according to the third embodiment.

FIG. 10 is a circuit diagram illustrating specific examples of circuit constitutions of the oscillation circuit 150 and the power transmission circuit 160. In the examples described here, the constitution of the oscillation circuit 150 is similar to the constitution illustrated in FIG. 5A, and the constitution of the power transmission circuit 160 is similar to the constitution illustrated in FIG. 5B. The constitution of the oscillation circuit 150 and that of the power transmission circuit 160 are not limited to those described above, but various constitutions may be possible as described above.

The power transmitting device 100 according to the present embodiment is capable of operating in following three modes: an object detection mode (first operation mode), a alignment mode (second operation mode), and a power transmission mode (third operation mode). These modes are described below.

As described above, when the receiver resonator 210 is resonating, it looks as if there is a metal plate approaching when seen from the power transmission side as described above. In other words, if a metal plate actually comes to a location close to the detection coil L1, it is impossible to distinguish whether the metal plate or the power receiving coil L2 is at the close location. Therefore, there is a possibility that power is incorrectly transmitted to the metal plate. In the present embodiment, to avoid such a problem, the switch S3 is connected to an adjustment coil (inductor L10).

In the present embodiment, the resonance frequency of the receiver resonator 210 is set to f2 (corresponding to fr in the first embodiment). In a case where the switch S3 is turned off in the state in which the switches S1 and S2 are on, the oscillation circuit 150 operates at a frequency f1 lower than f2. The circuit constants of the detection coil L1, the power receiving coil L2, the inductor L10, and the capacitors C1, C2, and C20 are set such that when the switch S3 is turned on, the oscillation circuit 150 operates at the predetermined frequency f2.

Figure 11A:
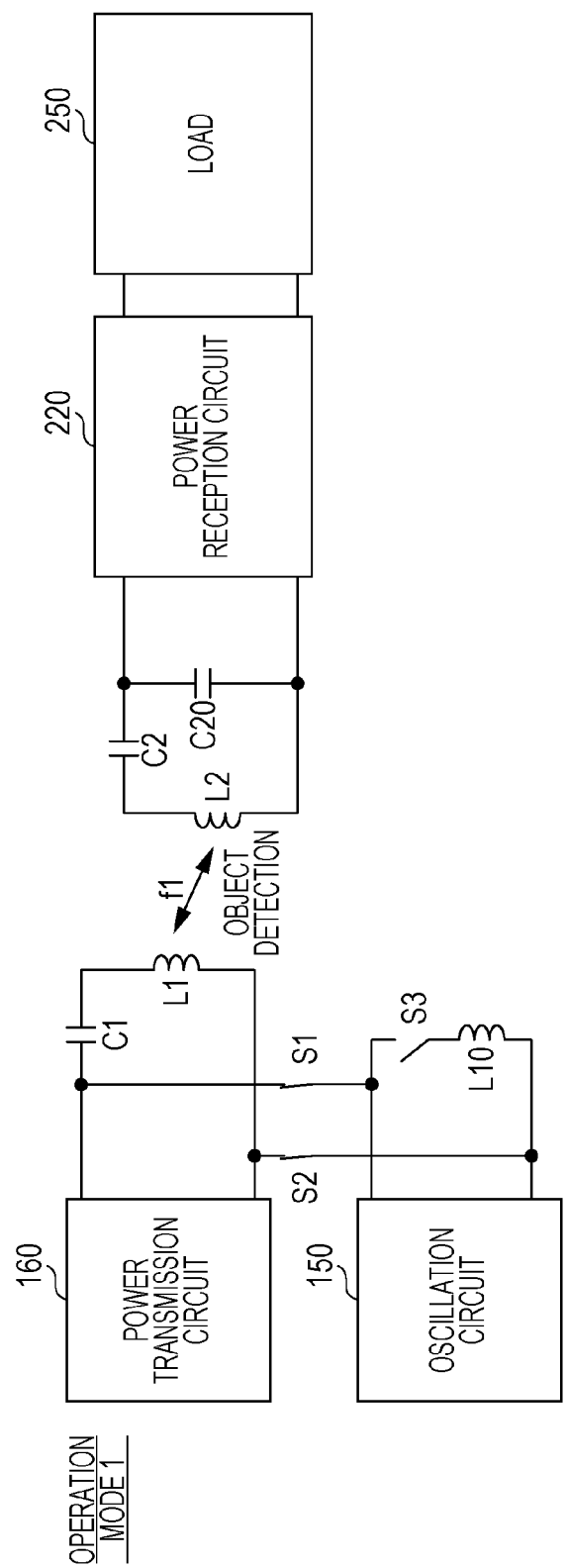
FIG. 11A is a diagram illustrating states of switches in a first operation mode according to the third embodiment.
Figure 11C:
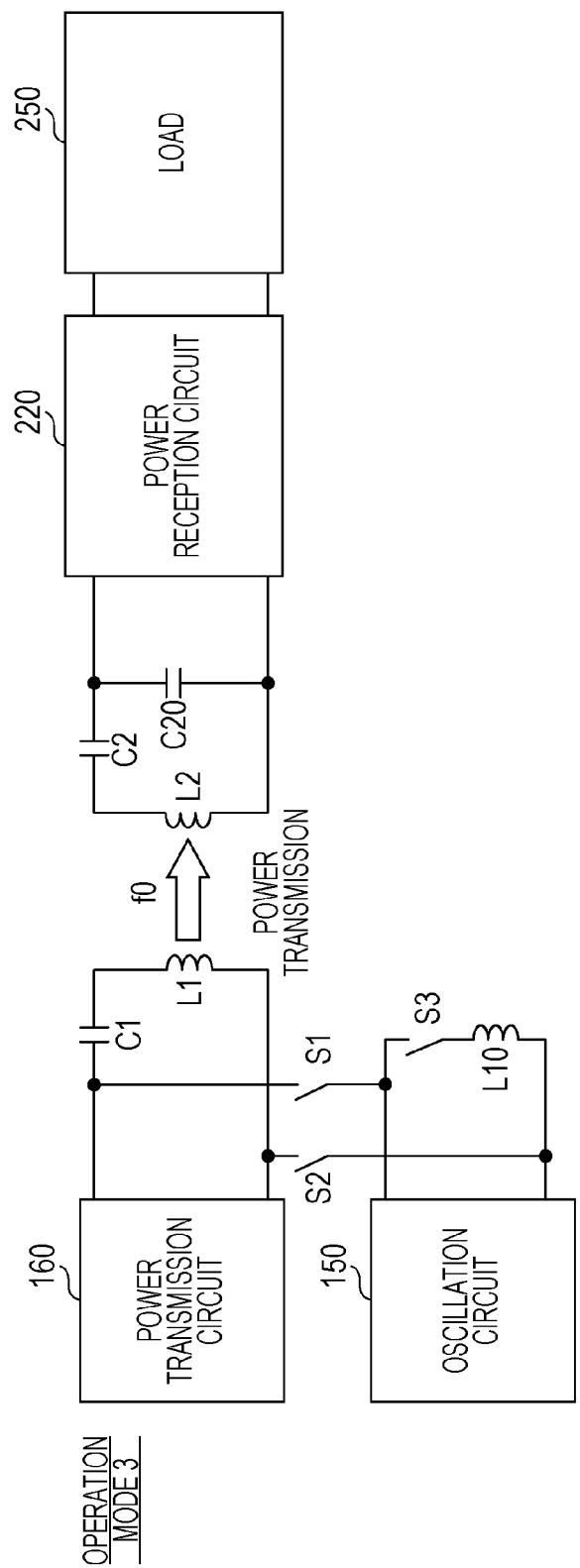
FIG. 11C is a diagram illustrating states of the switches in a third operation mode according to the third embodiment.

FIGS. 11A to 11C are diagrams illustrating states of switches in the first to third operation modes, respectively. In the first operation mode, the switches S1 and S2 are turned on and the switch S3 is turned off to oscillate at the frequency f1. This makes it possible, as described later, to determine whether an approaching object is the power receiving coil L2 or not. In the second operation mode, the switch S3 is turned on from the state of the first operation mode to oscillate at the frequency f2. This makes it possible, as with the first embodiment and the second embodiment, to detect the degree to which the power receiving coil L2 approaches. In the third operation mode, the switches S1, S2, and S3 are turned off after the positioning is completed, and the power transmission circuit 160 is driven to transmit power at the frequency f0. Note that the frequencies f0, f1, and f2 are determined depending on the on/off states of the switches S1, S2, and S3. In the present embodiment, f0<f1<f2.

The first operation mode and the second operation mode are described in further detail below.

Figure 12A:
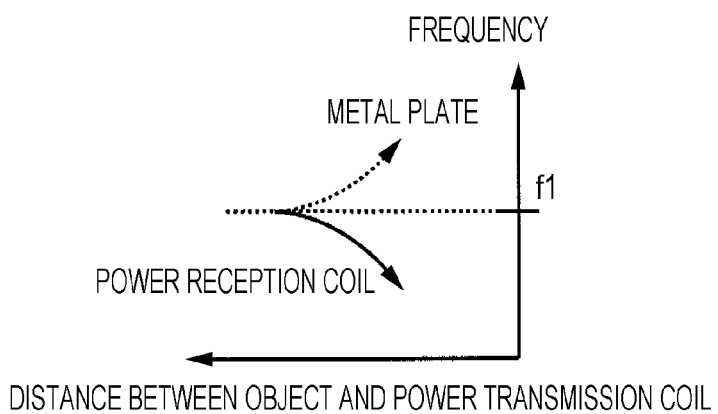
FIG. 12A is a graph illustrating an example of a change in oscillation frequency as a function of the distance between an object and a power transmitting coil L1 when the object approaches the power transmitting coil L1 while the oscillation circuit 150 is oscillating at a frequency f1.

FIG. 12A is a graph illustrating an example of a change in oscillation frequency as a function of the distance between an object and the detection coil L1 when the object approaches the detection coil L1 in the first operation mode in which the oscillation circuit 150 is oscillating at the frequency f1. In this graph, a horizontal axis represents the distance such that the distance decreases in a direction toward the right. As can be seen from FIG. 12A, the frequency changes differently depending on whether the power receiving coil L2 or a metal plate approaches.

Figure 12B:
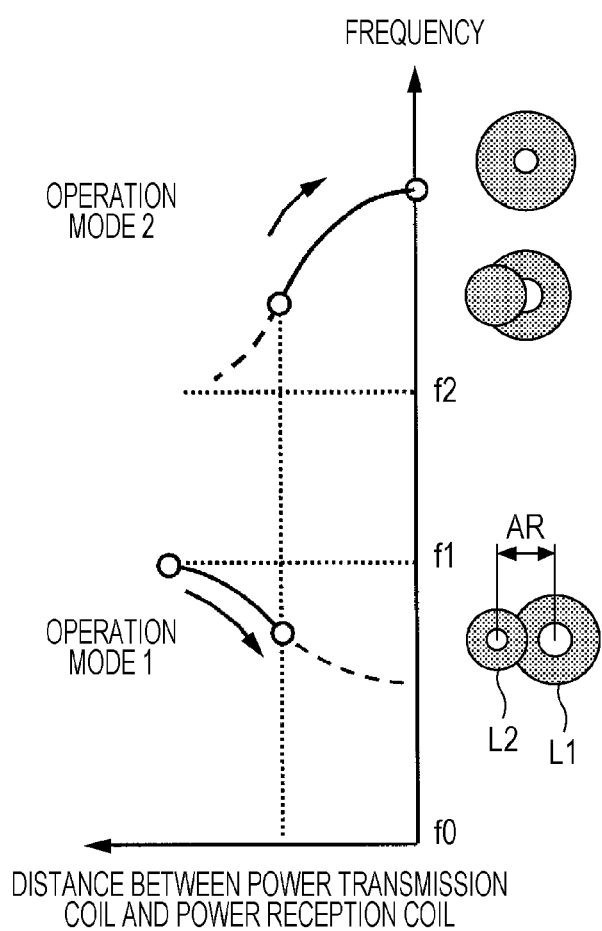
FIG. 12B is a diagram illustrating an example of transition from a first operation mode to a second operation mode.

In the case where the switch S3 is turned off to oscillate at the frequency f2 (second operation mode), the capacitor C20 connected in parallel to the power receiving coil L2 is not short-circuited. Therefore, as described above, because of an influence of the power reception circuit 220, a reduction in positioning accuracy occurs. However, ordinary, the power receiving coil L2 has a magnetic material serving as an electromagnetic shield to reduce an influence of electromagnetic noise on a circuit disposed close to the power receiving coil L2. When this magnetic material comes to a location close to the detection coil L1, the impedance of the detection coil L1 tends to increase. That is, as illustrated in FIG. 12A, the oscillation frequency changes in a direction in which the oscillation frequency decreases from f1. On the other hand, a metal plate comes to a close location, the impedance of the detection coil L1 tends to decrease. That is, the oscillation frequency changes in a direction in which the oscillation frequency increases from f1. Based on the characteristic described above, by checking whether the approaching of an object causes the frequency to increase or decrease with reference to the oscillation frequency f1, it is possible to determine whether a metallic object or the power receiving coil L2 is approaching. In the present embodiment, the detection circuit 120 and the control circuit 130 operate such that only when the determination described above indicates that the power receiving coil L2 is approaching, the switch S3 is turned on and oscillation is made at the frequency f2. That is, as illustrated in FIG. 12B, when a reduction in oscillation frequency to a particular level lower than f1 occurs during the operation in the first operation mode, the control circuit 130 turns on the switch S3 to switch to the second operation mode. In this situation, because the power receiving coil L2 has come to a position to a certain extent, the oscillation frequency changes to a value higher than the oscillation frequency f2 that occurs when the power receiving coil L2 is located far away. Thereafter, when the oscillation frequency reaches a value equal to or higher than a predetermined value higher than f2, it is determined that the positioning is completed. Thus, only when the power receiving coil L2 is at a close location, the operation mode goes to the second operation mode to perform the positioning of the power receiving coil L2, and thus it is ensured to perform the positioning accurately without heating a metallic object.

Next, the operation according to the present embodiment is described in further detail below.

Figure 13:
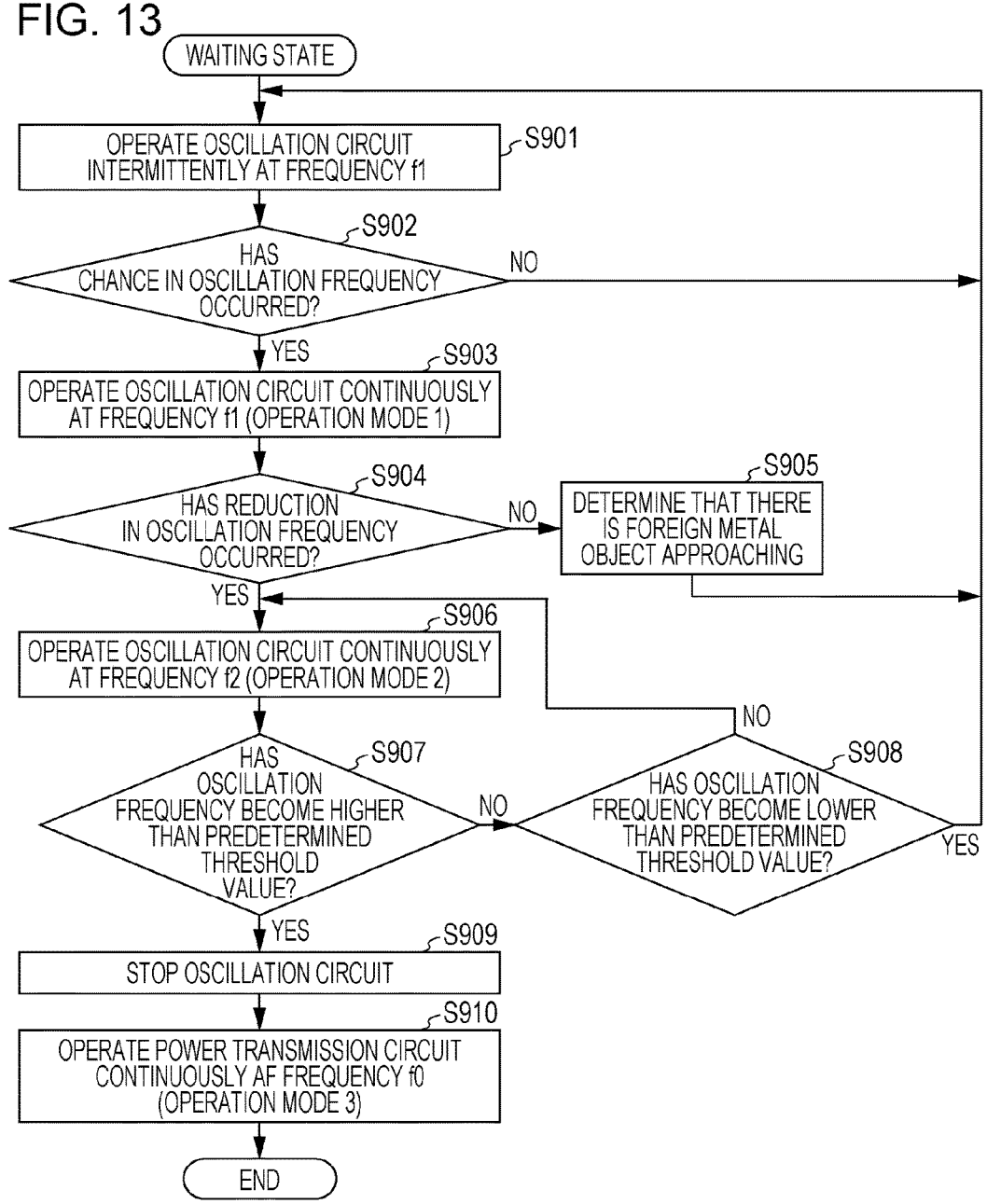
FIG. 13 is a flow chart illustrating a specific example of an operation according to the third embodiment.

FIG. 13 is a flow chart illustrating a specific example of an operation according to the present embodiment. When the power of the power transmitting device 100 is turned on and the power transmitting device 100 goes to a waiting state, the control circuit 130 controls the oscillation circuit 150 to operate intermittently (step S901). That is, in the state in which the switches S1 and S2 are on and the switch S3 is off, the oscillation circuit 150 is controlled to oscillate intermittently at predetermine time intervals (for example, every one milliseconds to a few seconds), and whether or not a change in oscillation frequency has occurred is monitored using the detection circuit 120 (step S902). In a case where no increase in the oscillation frequency is detected, it can be determined that there is no approaching object, and thus the processing flow returns to step S901 to continue a similar operation. When the detection circuit 120 detects a change in oscillation frequency, it can be presumed that an object is coming closer, the control circuit 130 controls the oscillation circuit 150 to continuously operate at the frequency f1 (step S903).

Subsequently, the detection circuit 120 determines whether a reduction in oscillation frequency has occurred (step S904). Herein the determination whether a reduction in oscillation frequency has occurred may be performed, for example, by determining whether the amount of reduction in oscillation frequency has exceeded a predetermined threshold. In a case where it is determined that a reduction in oscillation frequency has not occurred, the control circuit 130 determines that not the power receiving coil L2 but a metallic object has come to a close position (step S905). In this case, the processing flow again returns to step S901 to repeat a similar operation. In this situation, a warning may be given to a user, for example, by generating an alarm sound or turning on a light source in a blinking manner. In a case where it is determined step S904 that a reduction in the oscillation frequency has occurred, the control circuit 130 determines that the power receiving coil L2 has come to a close position, and the control circuit 130 controls the oscillation circuit 150 to switch the oscillation frequency to the frequency f2 and continuously operate (step S906). In this situation, the control circuit 130 changes the operation mode to the second operation mode by changing the switch S3 from the off-state to the on-state.

Next, the detection circuit determines whether the oscillation frequency has exceeded the predetermined threshold (step S907). In a case where it is determined here that the oscillation frequency has not exceeded the predetermined threshold, the detection circuit 120 determines whether the oscillation frequency has become lower than a predetermined threshold lower than the threshold described above (step S908). This is performed to determine whether or not to switch the operation back to the intermittent mode to reduce the power. In a case where the oscillation frequency is not lower than the predetermined threshold, it is presumed that the power receiving device 200 is still at the close position, and thus operations in steps S906 and S907 are repeated. On the other hand, in the case where the oscillation frequency has become lower than the predetermined threshold, it is presumed that the power receiving device 200 has left sufficiently far away, and thus the processing flow returns to step S901 in which the control circuit 130 controls the oscillation circuit 150 to operate in the intermittent mode.

On the other hand, in the case where in step S907 the oscillation frequency exceeds the predetermined threshold, it can be determined that the power receiving coil L2 has come to a position sufficiently close to the detection coil L1, and thus the detection circuit 120 sends information indicating this fact to the control circuit 130. In response to receiving this information, the control circuit 130 stops the oscillation circuit 150 (step S909). In this situation, the control circuit 130 may control the light source 170 to emit light or may instruct the display 240 to display information indicating that the positioning is completed. This makes it possible to notify a user that the positioning is completed. Thereafter, the control circuit 130 turns off the switches S1, S2, and S3 to control the power transmission circuit 160 to continuously operate at the frequency f0 whereby changing the operation mode to the third operation mode (step S910).

In the present embodiment, via the operation described above, first, the power transmitting device 100 determines whether a moving object is the power receiving coil L2 or a metallic object, and only when the determination indicates that the power receiving coil L2 has come to a close position, the power transmitting device 100 performs the positioning of the power receiving coil L2. Thus it is ensured to perform the positioning accurately and without heating a metallic object.

Note that the operation in the present embodiment is not limited to the operation illustrated in FIG. 13. For example, the intermittent operation in steps S901 and S902 may be removed, and the determination process in step S908 may be removed. Furthermore, instep S907, there may be a plurality of thresholds, and information may be output to discretely indicate the degree of approaching of the power receiving coil L2 depending on the frequency level. On the other hand, the turning-on/off of the switch S3 may be controlled such that the off-state is set as the basic state, and the switch S3 may be turned on after it is detected that the power receiving coil L2 has come to a close position as described above, or the switch S3 is turned on and off periodically. Alternatively, two or more sets of the adjustment inductor L10 and the switch may be provided and the operation may be performed at three or more frequencies.

Conversely to the example described above, the detection circuit 120 may detect an object in a state in which the switches S1 and S2 are on and the switch S3 is off, and may detect the approaching of the power receiving coil L2 in a state in which the switches S1 and S2 are on and the switch S3 is on. In this case, the detection coil L1, the capacitor C1, the inductor L10, and the oscillation circuit 150 may be designed such that the oscillation frequency is different from f2 in the former state, and the oscillation frequency is substantially equal to f2 in the latter state. In other words, in either the state in which the switch is on and the state in which the switch is off, the detection circuit 120 detects whether an approaching object is the power receiving coil or not based on a change in oscillation frequency, and in the other state, the detection circuit 120 detects the degree of approaching of the power receiving coil L2 based on a change in oscillation frequency.

The present embodiment of the disclosure makes it possible to prevent a reduction in efficiency caused by a positioning error and prevent a risk that a leakage flux causes a metal at a close location to be heated abnormally.

Other Embodiments

Although the wireless power transmitting device and the wireless power transmitting system have been described above with reference to the first through the third embodiments, the present disclosure is not limited to these. However, the capacitor C20 on the power reception side and the L10 on the power transmission side are important in the positioning, and thus it is necessary to select proper values thereof depending on an application. Other examples of embodiments are described below.

Figure 14:
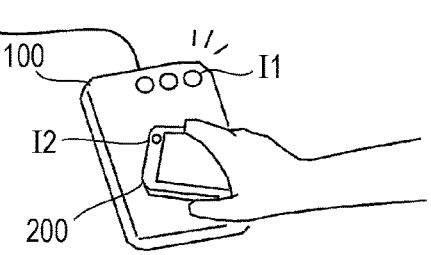
FIG. 14 is a diagram illustrating an example of a power transmitting device and a power receiving device according to another embodiment.

FIG. 14 is a diagram illustrating an example of a set of a power transmitting device 100 and a power receiving device 200. As illustrated in FIG. 14, a plurality of indicators I1 (light sources) are provided on the power transmission side. In response to a change in frequency or voltage of the oscillation circuit 150 caused by approaching of the power receiving coil L2 to the detection coil L1, information discretely indicating a level of positioning may be notified to a user by turning on a LED in a blinking fashion or by using a LED bar. This makes it possible to support the positioning in an intuitive manner. Similar indicators I2 (light sources) may be provided on the power reception side. In an extremely bright circumstance, the visibility of LEDs is low, and thus the notification may be provided using a sound or the like.

Figure 15:
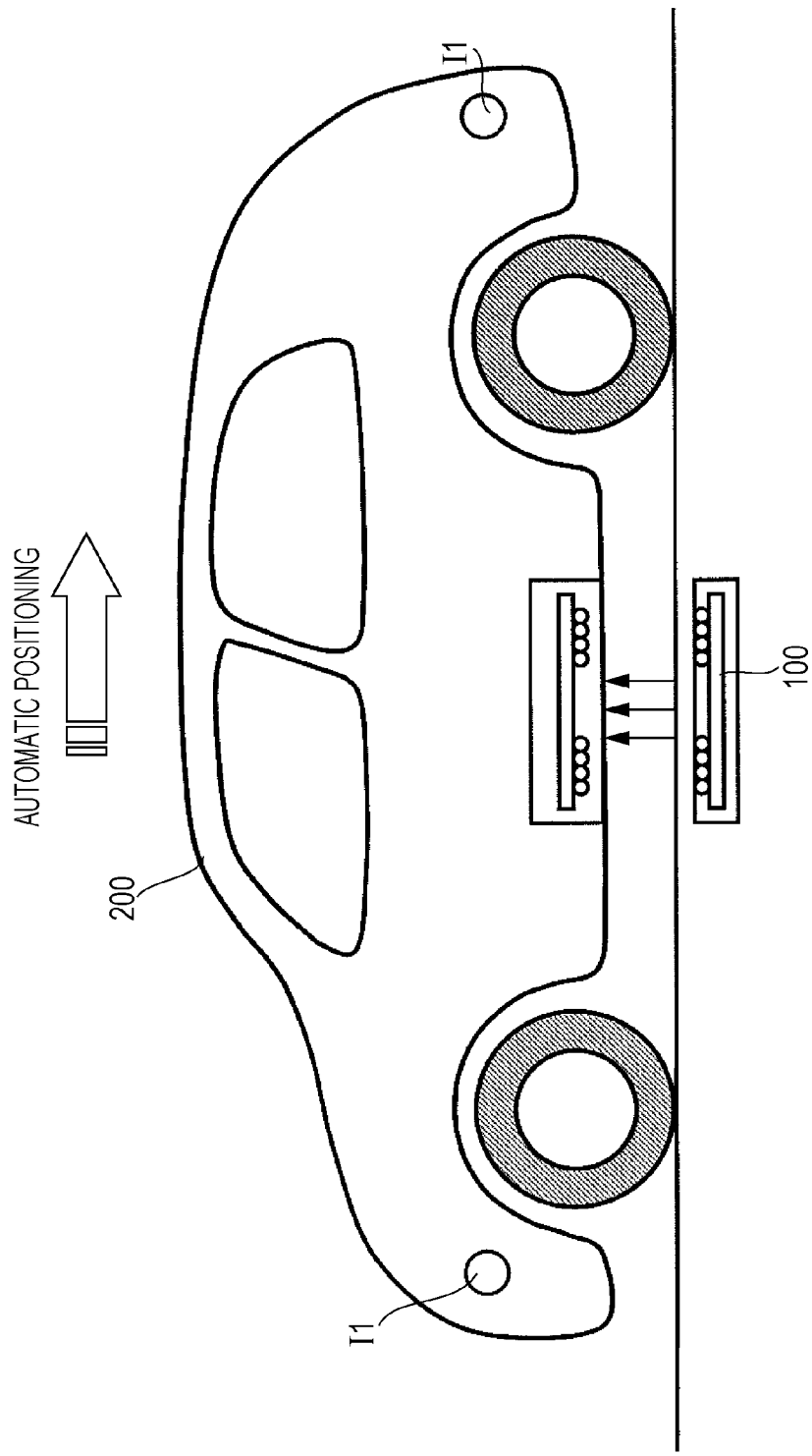
FIG. 15 is a diagram illustrating an example of a power transmitting device and a power receiving device according to another embodiment.

FIG. 15 is a diagram illustrating another example of a set of a power transmitting device 100 and a power receiving device 200. In this example, the power transmitting device 100 is a charging device having a power transmitting coil embedded in a road, and the power receiving device 200 is an electric vehicle having a power receiving coil. Also in this example, it is possible to support the positioning in an intuitive manner by indicating, using an indicator I1, whether the positioning is proper or not. In this example, when there is an error in the positioning of the power transmission-reception coil, the power receiving device 200 may be automatically moved to a proper position. Such automatic positioning may be performed on the side of the transmission antenna 100.

Instead of providing the indicator I1 on the power reception side as illustrated in FIG. 14 or 15, a notification of successful positioning may be given via communication from the power transmission side to the power reception side, and information indicating that the positioning is completed may be displayed on a screen or by a LED lamp on the power reception terminal. Alternatively, an audio signal may be sent from the power transmission side and it may be received by a speaker on the power reception side and information indicating whether the positioning is successfully completed or not may be displayed on the terminal screen. In an extremely bright circumstance, the visibility of LEDs is low, and thus the notification may be provided using a sound, vibration, or the like.

First Example: Positioning

Figure 16:
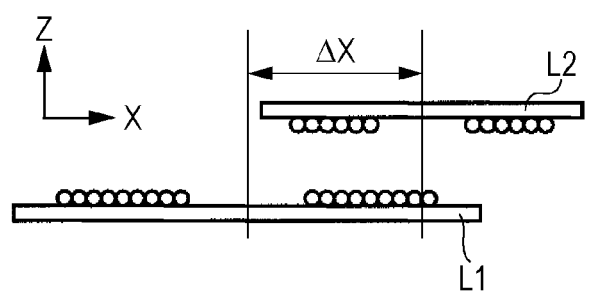
FIG. 16 is a diagram illustrating a situation in which a power receiving coil is approaching a detection coil according to a first example.

Next, a first example according to the present disclosure is described. A circuit diagram of the present example is the same as that illustrated in FIG. 10. As for the oscillation circuit 150, as illustrated in FIG. 10, a Pierece oscillation circuit using a logic IC is employed. A full-bridge inverter is used as the power transmission circuit 160. When positioning is evaluated, transistors Q1 to Q4 are turned off and switches S1, S2, and S3 are turned on. The evaluation is performed using a detection coil (=power transmitting coil) with a diameter (φ) of 40 mm and a power receiving coil of a diameter of 34 mm. The oscillation frequency of the output unit f_OUT of the oscillation circuit 150 was measured for a case where the power receiving coil approached the detection coil in a X axis as illustrated in FIG. 16. L10, C1, C11, and C12 were set such that the oscillation frequency of the oscillation circuit was equal to 998 kHz. C2 and C20 were set such that the power receiving coil resonated at 1000 kHz.

Figure 17:
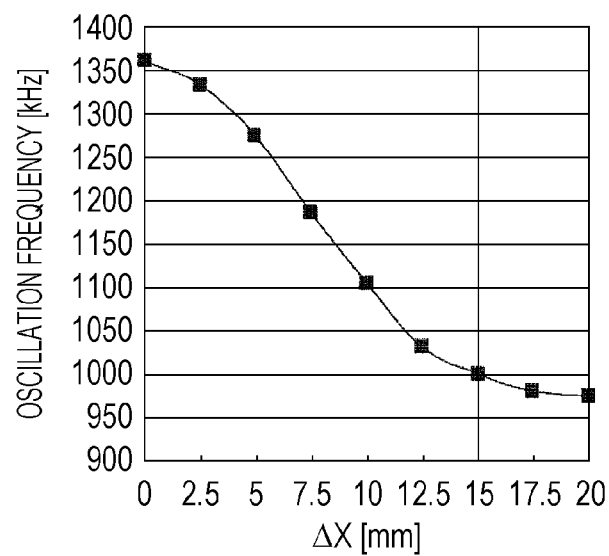
FIG. 17 is a diagram illustrating a result of a measurement of an oscillation frequency according to the first example.

FIG. 17 is a diagram illustrating a measurement result. A horizontal axis represents a horizontal deviation ΔX between the power receiving coil and the power transmitting coil, and a vertical axis represents an oscillation frequency. In a range of ΔX>15 mm, the impedance of the detection coil increases due to an influence of ferrite of the power receiving coil, and the oscillation frequency becomes lower than 998 kHz. However, it can be seen that in a range of ΔX≤15 mm, the oscillation frequency tends to increase as ΔX approaches 0 mm. This is because the power receiving coil resonates at a frequency equal to or higher than 1000 kHz. As the power transmitting coil and the power receiving coil are close in position, the electromagnetic coupling becomes stronger, which ensures that resonance occurs at a frequency equal to or higher than 1000 kHz. Therefore, in a case where setting is made, for example, such that it is determined that the positioning is completed when the resonance occurs at 1000 kHz, the detection coil according to the present example can provide a power transmission stage having an allowable positioning error of ±15 mm.

Second Example: Identifying Approaching Objet

The first example described above discloses a method of realizing the positioning of the power receiving coil. However, when the power receiving coil resonating at 1000 kHz approaches the detection coil resonating a frequency close to 1000 kHz, a characteristic is similar to that obtained when a metal plate approaches the detection coil. Metal coins exist in the world, and it is difficult to make a determination using only the above-described method as to whether the approaching object is the power receiving coil or a coin. In view of the above, in the constitution illustrated in FIG. 10, a measurement was made as to a change in oscillation frequency and a change in characteristic of voltage across the coil Vpp that occurred in a state in which the switch S3 was off. As for the approaching objects, a power receiving coil and a metal coin were used which were both set to resonate at 1000 kHz.

Figure 18:
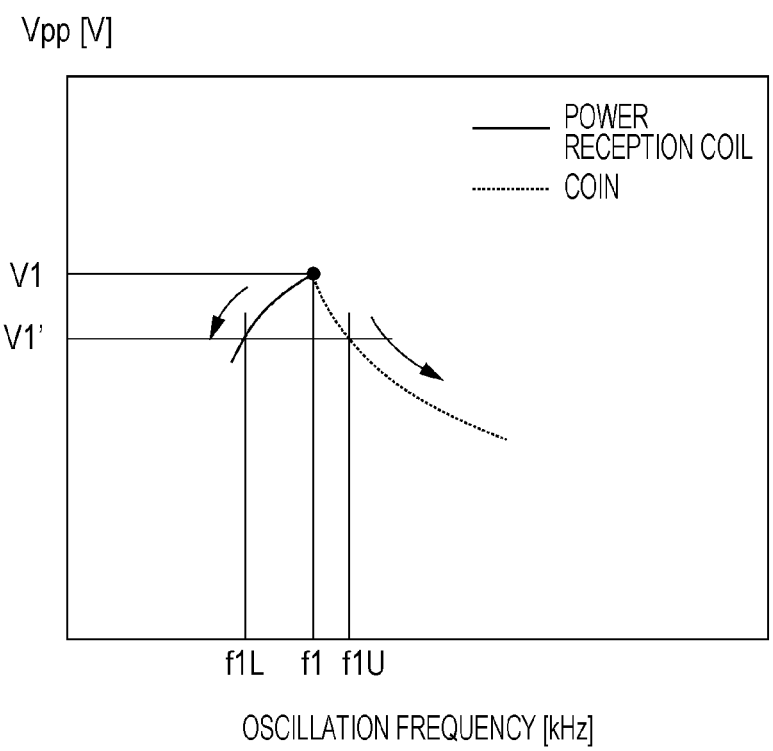
FIG. 18 is a diagram illustrating a result of a measurement of a characteristic change in terms of a voltage across the coil Vpp according to a second embodiment.

FIG. 18 is a diagram illustrating a measurement result. The fundamental oscillation frequency is f1 (<1000 kHz) and the voltage across the coil Vpp is V1. It can be seen from FIG. 18 that a change occurs along a different locus depending on the type of an approaching object. When the power receiving coil approaches, an increase occurs in the impedance of the detection coil by nature of ferrite disposed in the power receiving coil, and the oscillation frequency tends to decrease from f1. Because the power receiving coil is designed to resonate with C2 and C20 at frequency of 1000 kHz, an induced current does not easily occur in the coil, and an influence of ferrite may easily appear. In a case where a coin approaches, the impedance of the detection coil tends to decrease, which causes the oscillation frequency to increase from f1. Therefore, as described above, in the case where Vpp decreases to a value equal to or smaller than a predetermined threshold V1', if the oscillation frequency is equal to or lower than a predetermined threshold f1L, then it is determined that the power receiving coil has come to a close position and the switch S3 is turned on thereby changing the mode to the alignment mode. On the other hand, in a case where the oscillation frequency is equal to or higher than a predetermined threshold f1U, it is determined that a object exists, and a notification of this fact may be given to a user.

As described in the first and second examples, properly switching the switch S3 makes it possible to distinguish between a metallic object and the power receiving coil. After properly switching the switch S3, it is possible to make a correct position adjustment of the power receiving coil. However, the basic idea of the present disclosure is to perform positioning by measuring a change in the oscillation frequency in the power transmitting device. That is, the constitution of switches, the constitution of the oscillation circuit, electric constants of the inductors and the capacitors, the oscillation frequency, and other parameters are not limited to the values described above or the examples of the constitutions described above.

Third Example: Consideration on Q Value

Figure 19:
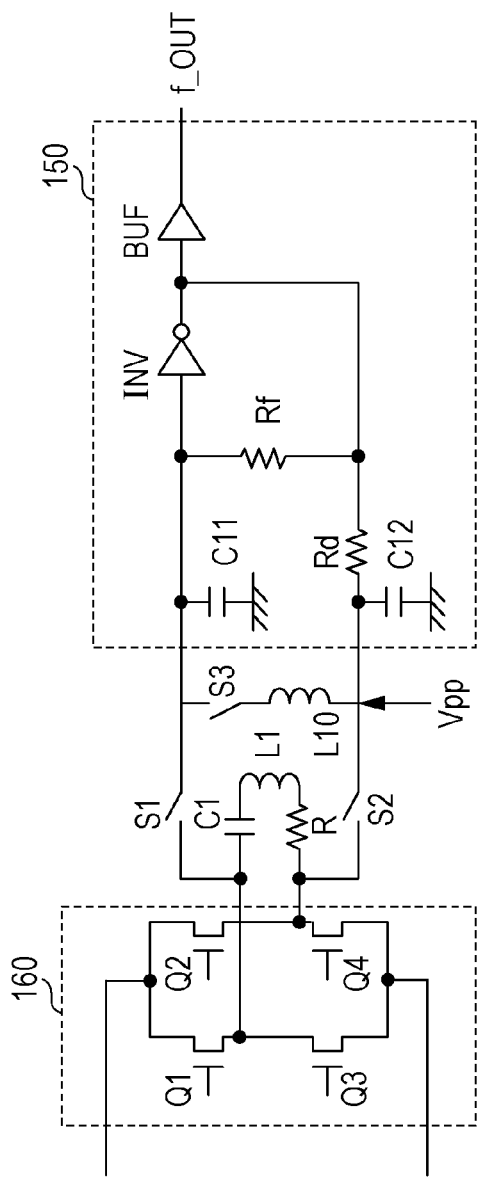
FIG. 19 is a diagram illustrating a circuit constitution according to a third example.

FIG. 19 illustrates a circuit diagram according to a third example of the present disclosure. The constitution illustrated in FIG. 19 is different from that illustrated in FIG. 10 only in that a resistor R exists below the detection coil L1. In practice, a coil is realized using a conductor having a finite conductivity, and thus any actual coil has a resistive component R. The Q value of the coil is given by Q=ωL/R where ω denotes an angular frequency. In the present example, while the value of the inductance L1 is fixed, the value of R is varied from 52 to 1000 mΩ and a resultant change in voltage across the coil Vpp with the change in Q value is analyzed by circuit simulation. Note that the analysis is performed for each of three values of damping resistor Rd of the oscillation circuit, that is, 470Ω, 1.1 kΩ, and 2.2 kΩ.

Figure 20A:
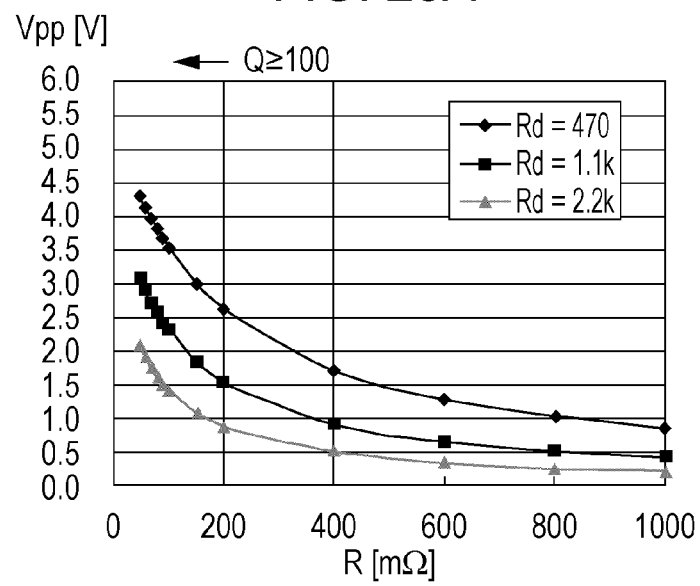
FIG. 20A is a diagram illustrating a first simulation result according to the third example.
Figure 20B:
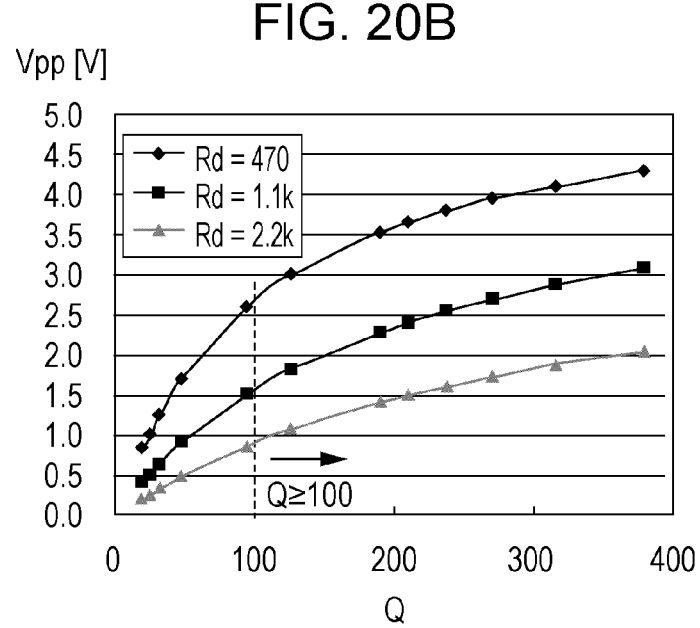
FIG. 20B is a diagram illustrating a second simulation result according to the third example.

FIG. 20A and FIG. 20B illustrate simulation results. The results show that the voltage across the coil Vpp tends to increase as Rd decreases and as the resistor R of the detection coil decreases (that is, as the Q value increases). Basically, the greater the detection signal level, the greater the resistance to noise, and the higher accuracy is possible in detection. This is because as the change in Vpp in response to a change in impedance increases, the resolution of a microcomputer (CPU) used in the detection circuit increases. However, a larger level of the detection signal does not simply results in a better result. Rd is selected taking into account many factors such as the characteristics of the switches S1 to S3, a change in impedance that occurs when the power receiving coil approaches, the range of the power supply voltage, and other parameters.

The wireless power transmitting device and the wireless power transmitting system according to the present disclosure may found a wide variety of applications in which charging or power supplying is performed, such as electric vehicles, AV devices, batteries, and the like.

What is claimed is:

1. A wireless power transmitting device that wirelessly transmits power to a power receiving device, comprising:
   a self-oscillator circuit;

a detection circuit that detects at least one of an oscillation frequency of the self-oscillator circuit or an output voltage of the self-oscillator circuit;

a detection transmitter resonator comprising a detection resonator that outputs, to detect a position of the wireless power receiving device, power output by the self-oscillator circuit;

a control circuit that detects a degree to which the power receiving device approaches the detection resonator, based on a result of a detection performed by the detection circuit;

a power transmission circuit that is connected to the detection transmitter resonator and that outputs AC power for transmitting power; and a first switch that switches a conduction state of a current between the detection transmitter resonator and the self-oscillator circuit; and a control circuit that switches a mode between an alignment mode, in which the first switch is turned on to operate the self-oscillator circuit, and a power transmission mode, in which the first switch is turned off to operate the power transmission circuit, wherein the detection transmitter resonator includes a capacitor, an inductor and a detection coil, the inductor being connected to the oscillation circuit and in parallel with the detection coil, wherein the wireless power transmitting device further comprises a second switch that switches a conduction state of a current from an output of the oscillation circuit to the inductor, wherein the detection circuit detects whether or not an approaching object is a power receiving coil of the power receiving device based on a change in the oscillation frequency when the second switch is in one of an on-state and an off-state, and detects the degree to which the power receiving coil approaches the detection coil based on a change in the oscillation frequency when the second switch is in an other state of the on-state and the off-state.

2. The wireless power transmitting device according to claim 1, wherein when the detected oscillation frequency becomes higher than a predetermined threshold, the detection circuit outputs information indicating that positioning between the power receiving device and the detection resonator is completed.

3. The wireless power transmitting device according to claim 1, wherein when an amplitude of the output voltage of the self-oscillator circuit becomes smaller than a predetermined threshold, the detection circuit outputs information indicating that positioning between the power receiving device and the detection resonator is completed.

4. The wireless power transmitting device according to claim 1, wherein the detection resonator has a Q value equal to or greater than 100 when the self-oscillator circuit is oscillating.

5. The wireless power transmitting device according to claim 1, wherein the oscillation frequency is substantially equal to a resonance frequency of a resonator of the power receiving device.

6. The wireless power transmitting device according to claim 1, wherein the oscillation frequency is set to be lower than a self-resonant frequency of the detection coil.

7. The wireless power transmitting device according to claim 1, wherein the oscillation frequency is set to be higher than a resonance frequency of the detection resonator.

8. The wireless power transmitting device according to claim 1, further comprising a light source control circuit that controls a light source to emit light based on a result of a detection performed by the detection circuit.

9. The wireless power transmitting device according to claim 8, wherein the light source control circuit changes a light source that emits light depending on the degree, detected by the detection circuit, to which the power receiving coil approaches the detection coil.

10. The wireless power transmitting device according to claim 8, further comprising the light source.

11. The wireless power transmitting device according to claim 1, further comprising a display control circuit that controls a display to display information indicating a result of a detection performed by the detection circuit.

12. The wireless power transmitting device according to claim 11, wherein the display is disposed in a power receiving device including a receiver resonator.

13. A wireless power transmitting system comprising:

a wireless power transmitting device; and a power receiving device including a receiver resonator, wherein the wireless power transmitting device includes:

a self-oscillator circuit;

a detection circuit that detects at least one of an oscillation frequency of the oscillation circuit or an output voltage of the oscillation circuit;

a detection transmitter resonator comprising a detection resonator that outputs, to detect a position of the wireless power receiving device, power output by the self-oscillator circuit;

a control circuit that detects a degree to which the power receiving device approaches the detection resonator, based on a result of a detection performed by the detection circuit;

a power transmission circuit that is connected to the detection transmitter resonator and that outputs AC power for transmitting power;

a first switch that switches a conduction state of a current between the detection transmitter resonator and the self-oscillator circuit; and a control circuit that switches a mode between an alignment mode, in which the first switch is turned on to operate the self-oscillator circuit, and a power transmission mode, in which the first switch is turned off to operate the power transmission circuit, wherein the detection transmitter resonator includes a capacitor, an inductor and a detection coil, the inductor being connected to the oscillation circuit and in parallel with the detection coil, wherein the wireless power transmitting device further comprises a second switch that switches a conduction state of a current from an output of the oscillation circuit to the inductor, wherein the detection circuit detects whether or not an approaching object is a power receiving coil of the power receiving device based on a change in the oscillation frequency when the second switch is in one of an on-state and an off-state, and detects the degree to which the power receiving coil approaches the detection coil based on a change in the oscillation frequency when the second switch is in an other state of the on-state and the off-state.

* * * * *